US011368065B2

(12) United States Patent
Aoki

(10) Patent No.: US 11,368,065 B2
(45) Date of Patent: Jun. 21, 2022

(54) CONTROLLER OF ROTATING ELECTRIC MACHINE

(71) Applicant: DENSO CORPORATION, Kariya (JP)

(72) Inventor: Yasuaki Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 16/668,465

(22) Filed: Oct. 30, 2019

(65) Prior Publication Data

US 2020/0144883 A1 May 7, 2020

(30) Foreign Application Priority Data

Nov. 5, 2018 (JP) .............................. JP2018-208162

(51) Int. Cl.
| | |
|---|---|
| *H02P 5/74* | (2006.01) |
| *H02K 3/28* | (2006.01) |
| *H02P 25/22* | (2006.01) |
| *H02K 21/16* | (2006.01) |
| *H02P 6/182* | (2016.01) |

(52) U.S. Cl.
CPC .............. *H02K 3/28* (2013.01); *H02K 21/16* (2013.01); *H02P 25/22* (2013.01); *H02P 6/182* (2013.01)

(58) Field of Classification Search
CPC .... H02K 21/16; H02K 11/0094; H02K 11/27; H02K 11/33; H02K 5/225; H02K 7/145; H02M 1/0009; H02M 7/53875; H02P 21/22; H02P 25/22; H02P 27/08; H02P 6/182; H02P 21/12; H02P 21/141; H02P 27/06; H02P 3/18; H02P 21/18; H02P 21/20; H02P 21/36; H02P 29/02; H02P 29/032; H01M 2220/30; H01M 50/10; H01M 50/20; H01M 50/543; H02J 7/00
See application file for complete search history.

(56) References Cited

U.S. PATENT DOCUMENTS

| | | | | |
|---|---|---|---|---|
| 6,094,025 A | * | 7/2000 | Rosa ......................... | H02P 3/06 318/245 |
| 2015/0069852 A1 | * | 3/2015 | Lindstrom ........... | H04B 5/0031 307/104 |

(Continued)

FOREIGN PATENT DOCUMENTS

| | | |
|---|---|---|
| JP | H06351280 A | 12/1994 |
| JP | 200352191 A | 2/2003 |
| JP | 200464903 A | 2/2004 |

*Primary Examiner* — Muhammad S Islam
(74) *Attorney, Agent, or Firm* — Maschoff Brennan

(57) ABSTRACT

A controller of a rotating electric machine performs a control on a control amount of the rotating electric machine by (a) calculating a voltage instruction value for controlling the control amount based on voltage detection values of the shunt resistors when shunt resistors in at least two phases have an electric current flowing therein, and (b) performing a drive control of each of switches in an inverter based on the calculated voltage instruction value. The controller determines whether a phase current flowing in a winding is detectable in at least two of three phases based on voltage values of the shunt resistors, and, when determining that the phase current is not detectable in the at least two phases, the controller performs the drive control based on a past current value or a past voltage value in a two-phase rotating coordinate system of the rotating electric machine.

10 Claims, 16 Drawing Sheets

(56) References Cited

U.S. PATENT DOCUMENTS

| | | | |
|---|---|---|---|
| 2015/0145449 A1* | 5/2015 | Mukai | H02M 1/32 318/400.22 |
| 2015/0256117 A1* | 9/2015 | Suzuki | H02P 27/085 62/160 |
| 2016/0036305 A1* | 2/2016 | Kawata | B62D 5/0463 180/443 |
| 2016/0094163 A1* | 3/2016 | Takahashi | B60L 50/61 318/400.06 |
| 2016/0149521 A1* | 5/2016 | Huang | H02P 3/12 318/379 |
| 2016/0164278 A1* | 6/2016 | Hayashi | B62D 5/0457 318/139 |
| 2016/0181954 A1* | 6/2016 | Satou | H02P 6/28 318/400.02 |
| 2016/0329850 A1* | 11/2016 | Mori | H02P 25/22 |
| 2017/0104437 A1* | 4/2017 | Suzuki | B62D 5/0481 |
| 2017/0179868 A1* | 6/2017 | Suzuki | H02P 29/50 |
| 2017/0201201 A1* | 7/2017 | Aoki | G01R 19/0092 |
| 2017/0294860 A1* | 10/2017 | Yamasaki | H02P 27/06 |
| 2017/0366101 A1* | 12/2017 | Suzuki | H02P 21/0003 |
| 2018/0022378 A1* | 1/2018 | Furukawa | B62D 5/046 324/76.77 |
| 2018/0287538 A1* | 10/2018 | Nakashima | B62D 5/0463 |
| 2019/0006979 A1* | 1/2019 | Suzuki | H02P 21/22 |
| 2019/0140499 A1* | 5/2019 | Takahashi | H02P 29/50 |

* cited by examiner

| VOLTAGE VECTOR | ON SWITCH | | | ARM |
|---|---|---|---|---|
| V0 | SUn | SVn | SWn | −IU, −IV, −IW |
| V1 | SUp | SVn | SWn | −IV, −IW |
| V2 | SUp | SVp | SWn | −IW |
| V3 | SUn | SVp | SWn | −IU, −IW |
| V4 | SUn | SVp | SWp | −IU |
| V5 | SUn | SVn | SWp | −IU, −IV |
| V6 | SUp | SVn | SWp | −IV |
| V7 | SUp | SVp | SWp | UNDETECTABLE |

Duty

SW MODE

SHUNT CURRENT

PH CURRENT DETECTABLE OR NOT

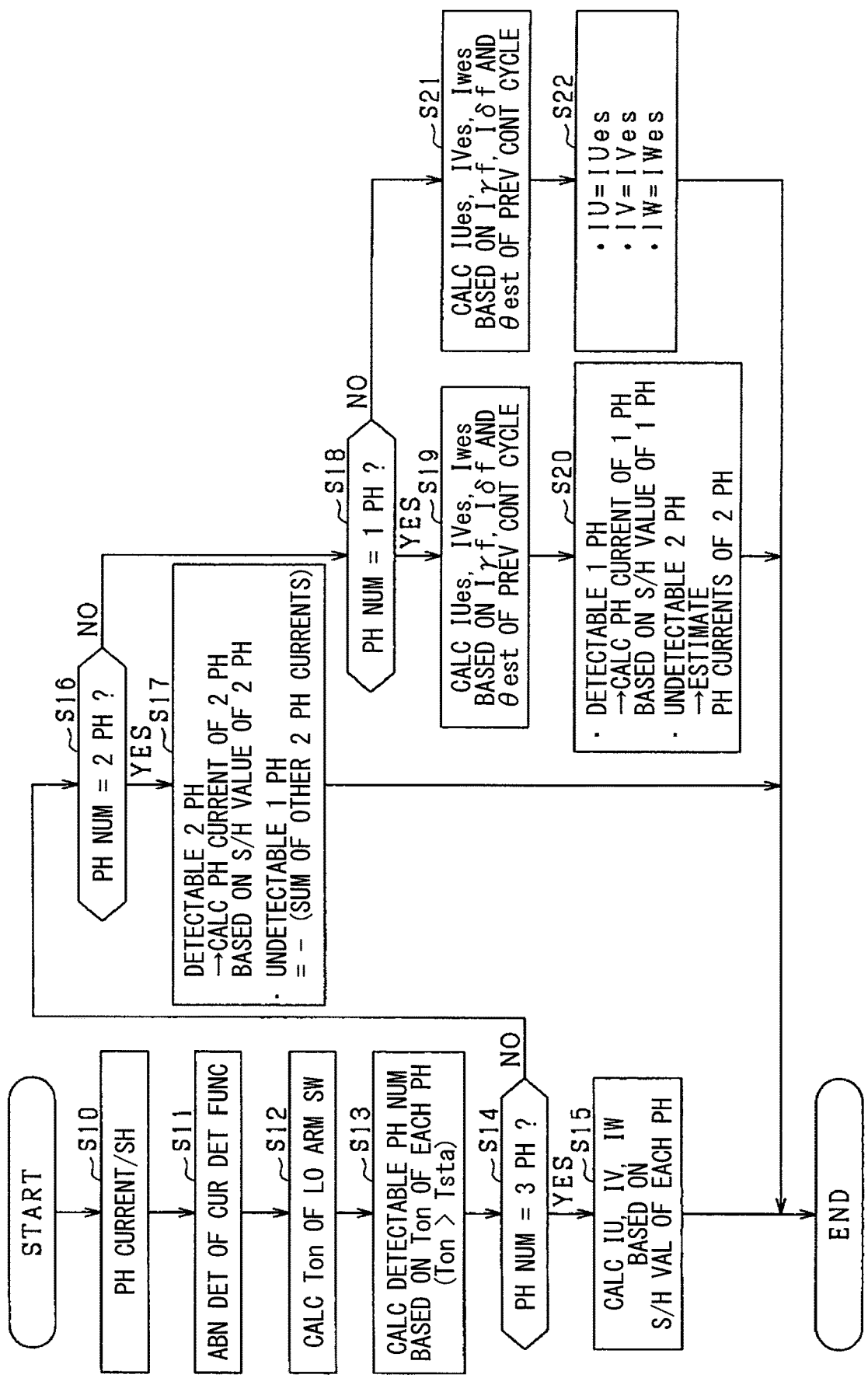

Duty

SW MODE

SHUNT CURRENT

PH CURRENT DETECTABLE OR NOT

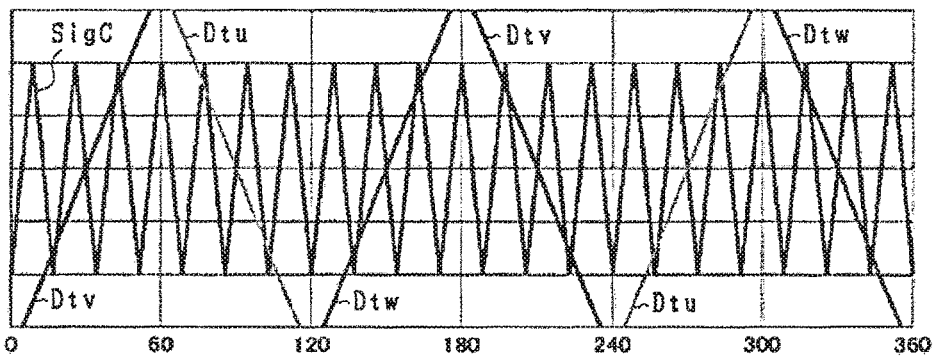
FIG 10A Duty
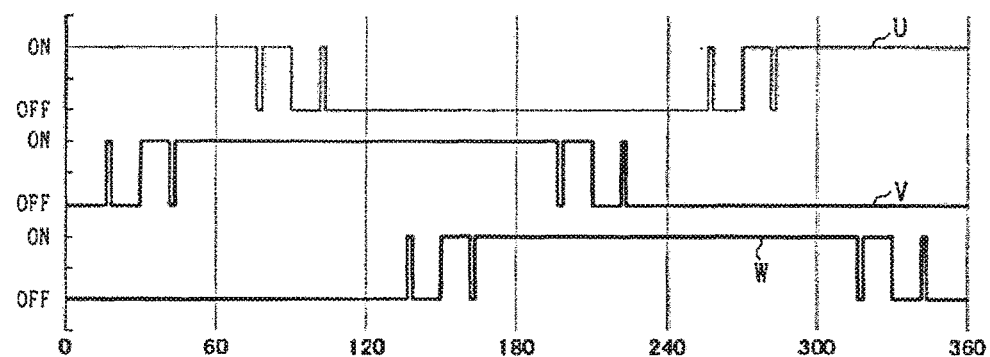
FIG 10B SW MODE
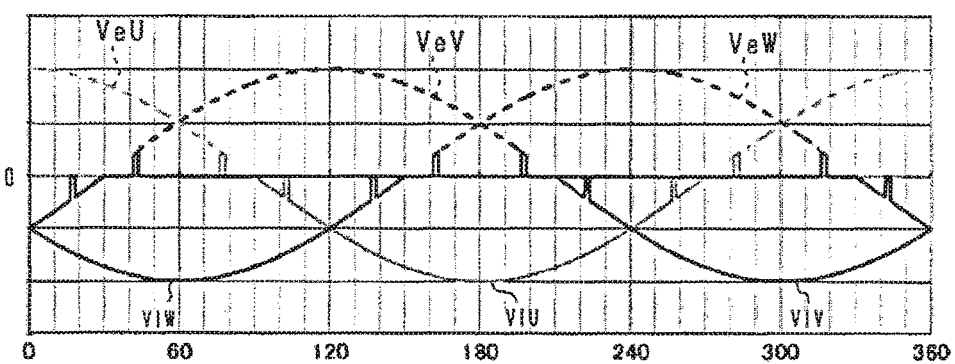
FIG 10C SHUNT CURRENT
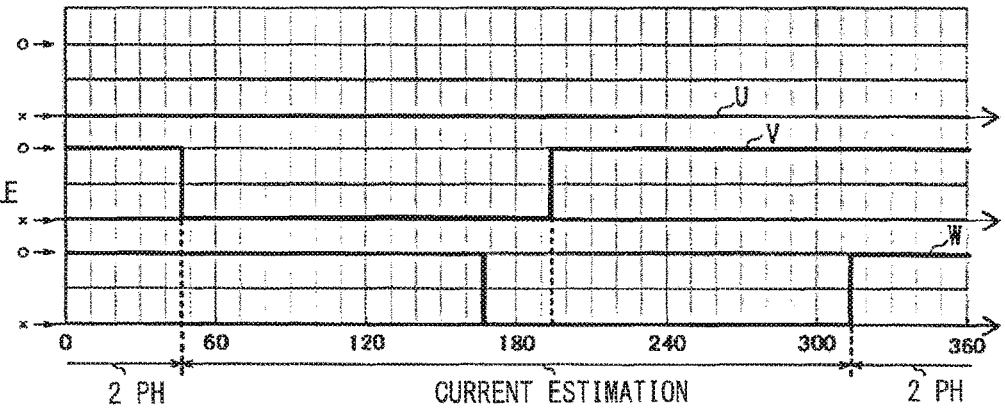
FIG 10D PH CURRENT DETECTABLE OR NOT

| DETECTABLE PH NUM | 2, 3 PH | 0, 1 PH |
|---|---|---|
| τ (LPF) | SHORT | LONG |

(※ PH CURRENT NORMALLY DETECTED)

| DETECTABLE PH NUM | 2, 3 PH | 0, 1 PH |
|---|---|---|
| FB GAIN OF 46 | LARGE | SMALL |

(※ PH CURRENT NORMALLY DETECTED)

| DETECTABLE PH NUM | 2, 3 PH | 0, 1 PH |
|---|---|---|
| FB GAIN OF 49 | LARGE | SMALL |

(※ PH CURRENT NORMALLY DETECTED)

FIG. 20

| VOLTAGE VECTOR | ON SWITCH | | | ARM |
|---|---|---|---|---|
| V0 | SUn | SVn | SWn | UNDETECTABLE |
| V1 | SUp | SVn | SWn | IU |
| V2 | SUp | SVp | SWn | IU, IV |
| V3 | SUn | SVp | SWn | IV |
| V4 | SUn | SVp | SWp | IV, IW |
| V5 | SUn | SVn | SWp | IW |
| V6 | SUp | SVn | SWp | IU, IW |
| V7 | SUp | SVp | SWp | IU, IV, IW |

CONTROLLER OF ROTATING ELECTRIC MACHINE

CROSS REFERENCE TO RELATED APPLICATION

The present application is based on and claims the benefit of priority of Japanese Patent Application No. 2018-208162, filed on Nov. 5, 2018, the disclosure of which is incorporated herein by reference.

TECHNICAL FIELD

The present disclosure generally relates to a control device, or a controller, of a rotating electric machine.

BACKGROUND INFORMATION

In the related art, a control device of certain type known to be applied to a system that includes (i) an inverter that has switches in upper and lower arms for three phases, (ii) a synchronous rotating electric machine with windings electrically connected to the inverter, and (iii) shunt resistors. The shunt resistors are electrically connected to only one of the upper and lower arms in each of the three phases.

The control device detects a voltage value of respective shunt resistors during a period in which an electric current flows in the shunt resistors of at least two phases. The control device calculates a voltage instruction value for controlling a control amount of the rotating electric machine to an instruction value based on a detected voltage value, and drives each of the switches constituting the inverter based on the calculated voltage instruction value.

In a system having a rotating electric machine, an inverter, and shunt resistors, when a phase current detection function has abnormality or when the rotating electric machine is in a certain operation state, the phase current of at least two out of three phases may become undetectable based on voltage values of the shunt resistors. However, even in such a situation, it is desirable to continue the control of a control amount of the rotating electric machine as much as possible.

SUMMARY

It is an object of the present disclosure to provide a control device, or a controller, of a rotating electric machine that is capable of continuing a control of a control amount of the rotating electric machine as much as possible even when phase currents are not detectable in at least two of three phases based on voltage values of shunt resistors.

BRIEF DESCRIPTION OF THE DRAWINGS

Objects, features, and advantages of the present disclosure will become more apparent from the following detailed description made with reference to the accompanying drawings, in which:

FIG. 8 is a flowchart of a procedure of the process performed by the control device;

FIG. 10A is a time chart involving an explanation of current estimation process when only one phase current is detectable due to abnormality of U phase current detection function;

FIG. 10B is another time chart involving an explanation of switching mode when only one phase current is detectable due to abnormality of U phase current detection function;

FIG. 10C is another time chart involving an explanation of inter-terminal voltages when only one phase current is detectable due to abnormality of U phase current detection function;

FIG. 10D is another time chart involving an explanation of phase current detection when only one phase current is detectable due to abnormality of U phase current detection function;

FIG. 20 is a diagram of a relationship between voltage vectors and detectable phase currents according to the other embodiments of the present disclosure.

DETAILED DESCRIPTION

First Embodiment

Hereinafter, the first embodiment of a control device, or a controller in short, for a rotating electric machine according to the present disclosure is described with reference to the drawings.

Figure 1:
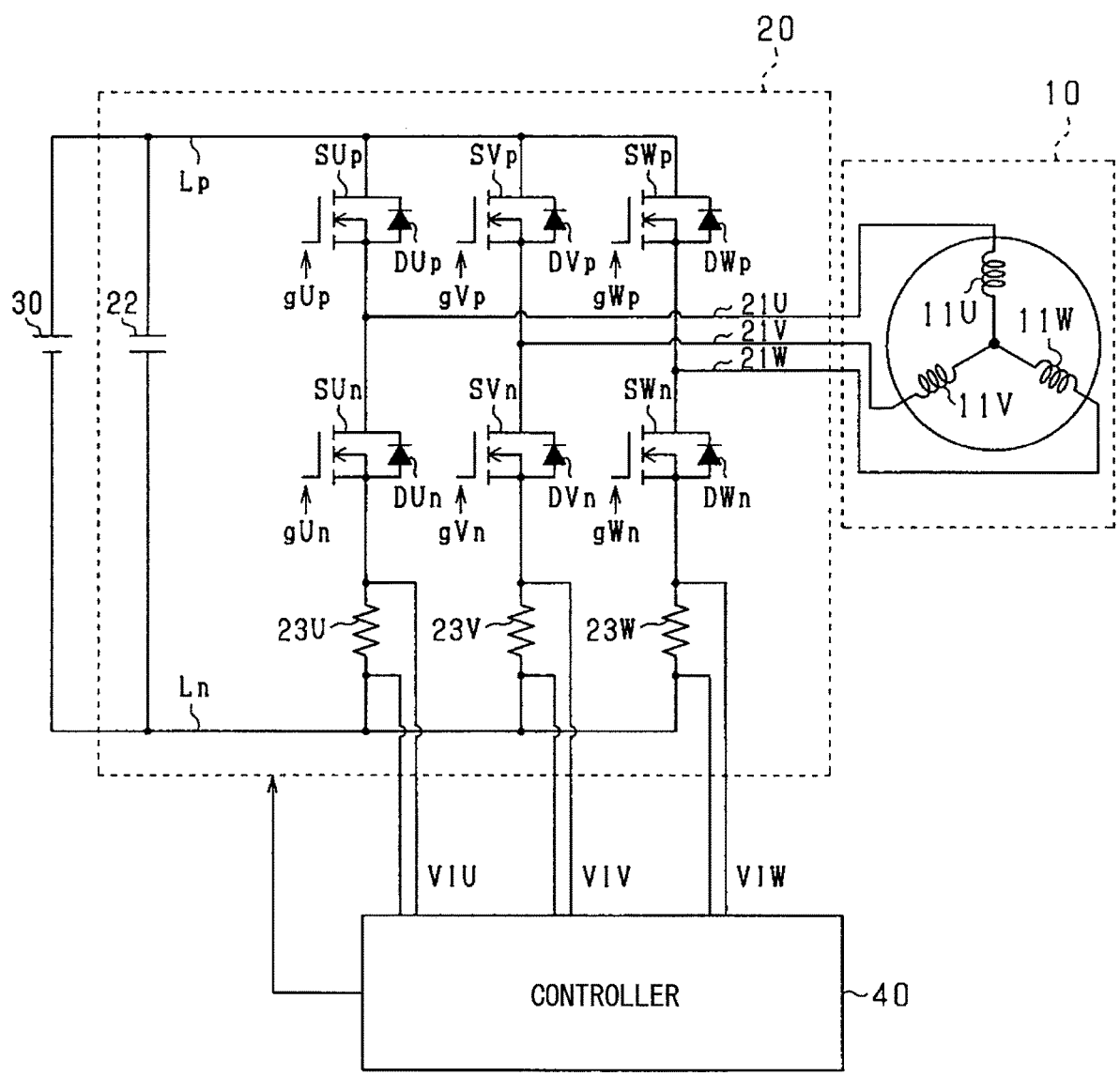
FIG. 1 is a diagram of a configuration of a control system of a rotating electric machine according to a first embodiment of the present disclosure.

As shown in FIG. 1, a control system includes a rotating electric machine 10, an inverter 20, and a controller 40 that controls the rotating electric machine 10. The rotating electric machine 10 is a three-phase synchronous motor, and includes U-, V- and W-phase windings 11U, 11V and 11W respectively as a stator winding. The synchronous motor may be, for example, a permanent magnet synchronous motor. In the present embodiment, the rotating electric machine 10 is an interior permanent magnet synchronous motor (IPMSM) of a salient pole type.

The rotating electric machine 10 is used, for example, as a driving power source of a vehicle or to drive an in-vehicle accessory. Examples of the in-vehicle accessory include an electric pump for generating hydraulic pressure in a hydraulic brake device of a vehicle, a radiator fan, a blower of an in-vehicle air conditioner, and a water pump.

The inverter 20 is provided with a series connection of upper arm switches SUp, SVp, SWp and lower arm switches SUn, SVn, SWn for three phases. In the present embodiment, voltage-controlled semiconductor switching elements are used as the switches SUp, SUn, SVp, SVn, SWp, and SWn, which are, more practically, N-channel MOSFETs. Therefore, a high potential side terminal of the switches SUp, SUn, SVp, SVn, SWp, SWn is a drain, and a low potential side terminal of those switches is a source. The switches SUp, SUn, SVp, SVn, SWp, SWn each have body diodes DUp, DUn, DVp, DVn, DWp, DWn.

The source of the U-phase upper arm switch SUp is connected to the first end of a U-phase conductive member 21U such as a bus bar and to the drain of the U-phase lower arm switch SUn. The first end of a U-phase winding 11U is connected to the second end of the U-phase conductive member 21U. The source of the V-phase upper arm switch SVp is connected to the first end of a V-phase conductive member 21V such as a bus bar and to the drain of the V-phase lower arm switch SVn. The first end of a V-phase winding 11V is connected to the second end of the V-phase conductive member 21V. The source of the W-phase upper arm switch SWp is connected to the first end of a W-phase conductive member 21W such as a bus bar and to the drain of the W-phase lower arm switch SWn. The first end of a W-phase winding 11W is connected to the second end of the W-phase conductive member 21W. The second ends of the U, V, and W-phase windings 11U, 11V, and 11W are respectively connected to each other at a neutral point.

The drains of the U, V, W-phase upper arm switches SUp, SVp, SWp and the positive electrode terminal of a storage battery 30, which is a DC power source, are connected by a positive electrode side bus Lp. On the positive electrode side bus Lp, the first end of a smoothing capacitor 22 is connected to a position between (i) the connection point of one of the upper arm switches SUp, SVp, SWp closest to the positive electrode terminal of the storage battery 30, and (ii) the positive electrode terminal of the storage battery 30.

The first ends of U, V, W-phase shunt resistors 23U, 23V, 23W are connected to the sources of the U, V, W phase lower arm switches SUn, SVn, SWn. The second ends of the U, V, W phase shunt resistors 23U, 23V, 23W and the negative electrode terminal of the storage battery 30 are connected by a negative electrode side bus Ln. On the negative electrode side bus Ln, the second end of the smoothing capacitor 22 is connected to a position between (i) the connection point of one of the shunt resistors 23U, 23V, 23W closest to the negative electrode terminal of the storage battery 30 and (ii) the negative electrode terminal of the storage battery 30.

The controller 40 has, as a main component, a microcontroller, and switches, each of the switches constituting the inverter 20 in order for feedback-controlling the control amount of the rotating electric machine 10 to an instruction value. In the present embodiment, the control amount is an electric angular speed (i.e., a rotation speed), and the instruction value thereof is an instruction angular speed $\omega^*$. The controller 40 performs the switching operation of each of the switches of the inverter 20 such that a voltage vector applied from the inverter 20 to each of the phase windings 11U to 11W becomes (i.e., serves as) an instruction voltage vector for controlling the electric angular speed to the instruction angular speed $\omega^*$. As a result, sinusoidal phase currents which are 120 degrees shifted from each other flow through the phase windings 11U, 11V, 11W.

The controller 40 performs a position sensor-less control, and estimates an electric angle in such control. The position sensor-less control is a control of the rotating electric machine 10 without using rotation angle information of the rotating electric machine 10 detected by an angle sensor such as a Hall element, a resolver or the like.

Note that, the controller 40 realizes various control functions by executing a program stored in a storage device provided in itself. The various functions may be realized by electronic circuits (i.e., "hardware"), or may be realized by using both of hardware and software.

Figure 2:
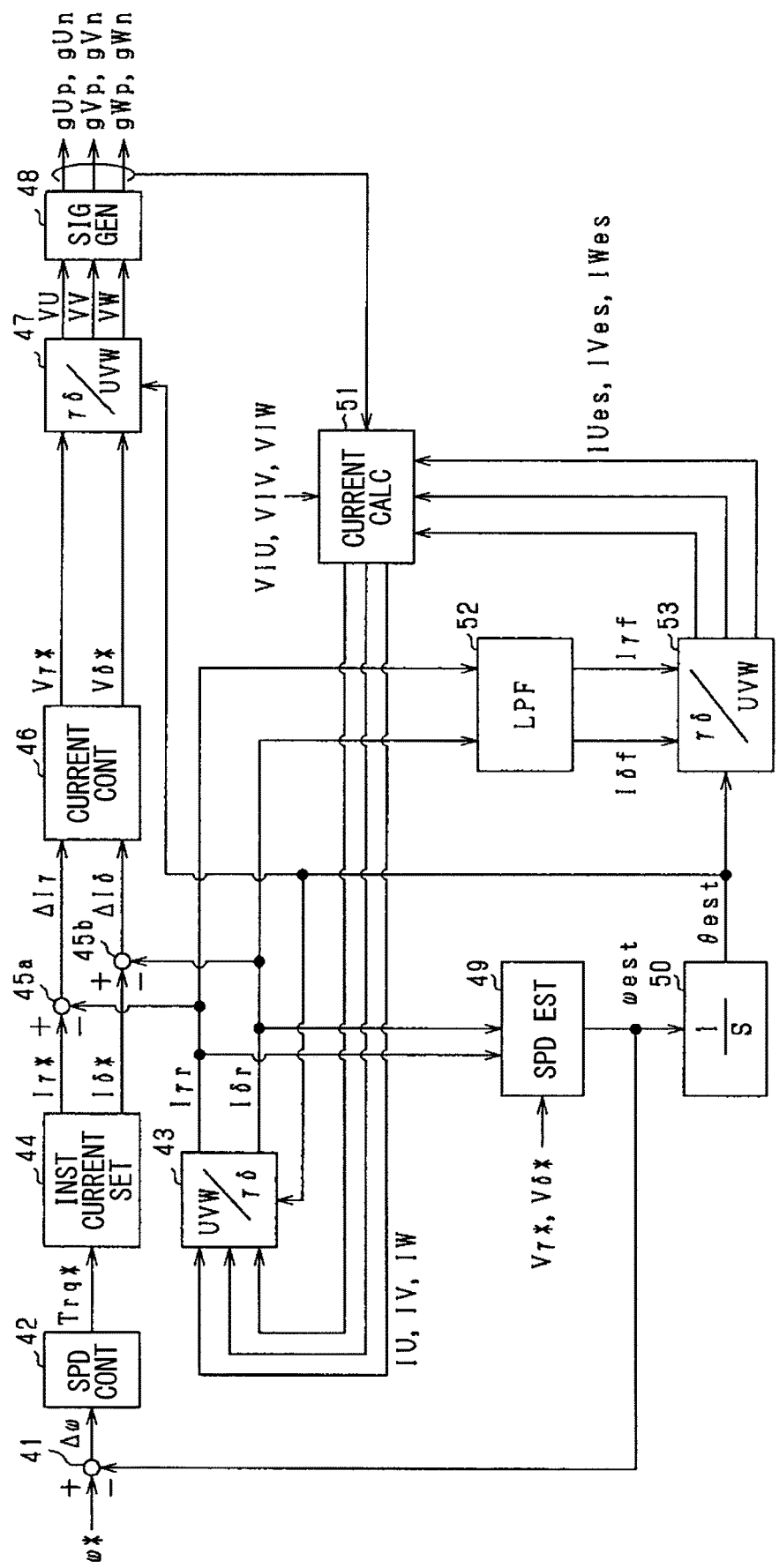
FIG. 2 is a block diagram of a process performed by a control device.

Subsequently, a process performed in the controller 40 is described in detail using a block diagram of FIG. 2.

A speed deviation calculator 41 calculates a speed deviation $\Delta\omega$ by subtracting an estimated angular speed $\omega$est calculated by a speed estimator 49 described later from the instruction angular speed $\omega^*$. The estimated angular speed $\omega$est is an estimated value of the electric angular speed. The instruction angular speed $\omega^*$ has a positive value when the rotor of the rotating electric machine 10 is rotated in a specific direction (i.e., a forward direction), and has a negative value when the rotor is rotated in a direction opposite to the specific direction.

A speed controller 42 calculates an instruction torque Trq* of the rotating electric machine 10 as an operation amount for a feedback control of the speed deviation $\Delta\omega$ to zero. The instruction torque Trq* has a positive value when rotating the rotor in a specific direction, and has a negative value when rotating the rotor in a direction opposite to the specific direction. Note that, for example, a proportional integral control may be used as the feedback control in the speed controller 42.

A current converter 43 converts U, V, W phase currents in a UVW coordinate system to a γ axis current Iγr and a δ axis current Iδr in a γδ coordinate system, based on an estimated angle θest calculated by an angle estimator 50 described later and phase currents IU, IV, IW calculated by a current calculator 51 described later. The estimated angle θest is an estimated value of the electric angle. The UVW coordinate system is a three-phase fixed coordinate system of the rotating electric machine 10, and the γδ coordinate system is an estimated coordinate system of a dq coordinate system which is a two-phase rotating coordinate system of the rotating electric machine 10.

Figures 3, 4:
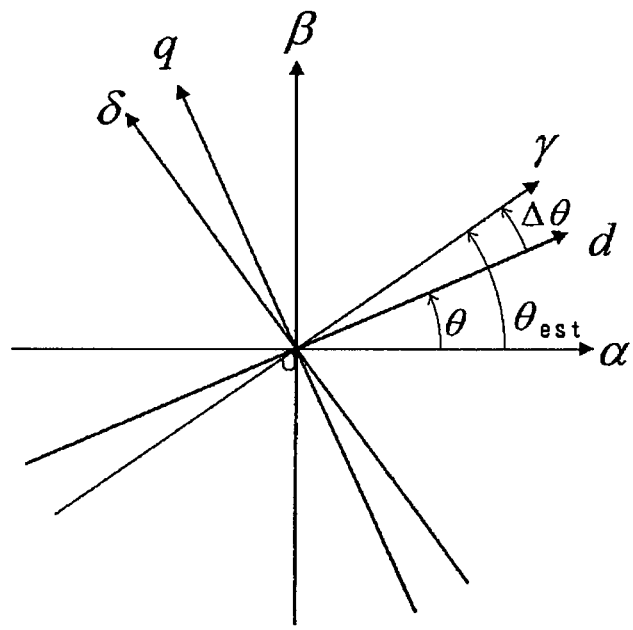
FIG. 3 is a diagram of a dq coordinate system and a γδ coordinate system.
FIG. 4 is a diagram of a relationship between voltage vectors and detectable phase currents.

Here, the UVW coordinate system is a three-phase fixed coordinate system of the rotating electric machine 10, and the γδ coordinate system is an estimated coordinate system of a dq coordinate system which is a two-phase rotating coordinate system of the rotating electric machine 10. FIG. 3 shows the γδ coordinate system, the dq coordinate system, and an αβ coordinate system which is a two-phase fixed coordinate system. The dq coordinate system is a coordinate system defined by (i) a d axis extending in the direction of an actual magnetic pole position through an origin O and (ii) a q axis extending in the direction perpendicular to the d axis through the origin O. The γδ coordinate system is a coordinate system defined by (i) a γ axis extending in the direction of an estimated magnetic pole position through the origin O and (ii) a δ axis extending in the direction orthogonal to the γ axis through the origin O. In FIG. 3, an angle between an α axis of the αβ coordinate system and the γ axis of the γδ coordinate system is shown as the estimated angle θest, and an angle between the α axis and the d axis of the dq coordinate system is shown as an actual electric angle θ. An angle between the d axis and the γ axis is shown as an estimation error Δθ. The dq coordinate system is a coordinate system that rotates at the electric angular speed of the rotating electric machine 10 with respect to the αβ coordinate system.

Referring back to FIG. 2, an instruction current setter 44 sets a γ axis instruction current Iγ* and a δ axis instruction current Iδ* based on the instruction torque Trq*. An instruction current vector in the γδ coordinate system is determined by the γ axis instruction current Iγ* and the δ axis instruction current Iδ*. The γ axis instruction current Iγ* and the δ axis instruction current Iδ* correspond to a current instruction value in the γδ coordinate system.

A γ axis deviation calculator 45a calculates a γ axis deviation ΔIγ as a value obtained by subtracting the γ axis current Iγr from the γ axis instruction current Iγ*. A δ axis deviation calculator 45b calculates a δ axis deviation ΔIδ as a value obtained by subtracting the δ axis current Iδr from the δ axis instruction current Iδ*.

A current controller 46 calculates a γ axis instruction voltage Vγ* as an operation amount for feedback controlling the γ axis current Iγr to the γ axis instruction current Iγ* based on the γ axis deviation ΔIγ. The current controller 46 also calculates a δ axis instruction voltage Vδ* as an operation amount for feedback controlling the δ axis current Iδr to the δ axis instruction current Iδ* based on the δ axis deviation ΔIδ. An instruction voltage vector in the γδ coordinate system is determined by the γ axis instruction voltage Vγ* and the δ axis instruction voltage Vδ*. In the present embodiment, the instruction voltages Vγ* and Vδ* correspond to voltage instruction values. As the feedback control in the current controller 46, at least one of proportional control, differential control and integral control may be used, and, for example, proportional integral control may be used therein.

A voltage converter 47 calculates U, V, W-phase instruction voltages VU, VV, VW that have 120° phase shift with each other in the electric angle based on the γ axis instruction voltage Vγ*, the δ axis instruction voltage Vδ* and the estimated angle θest. In the present embodiment, each of the instruction voltages VU, VV, VW is a sine wave signal.

A signal generator 48 divides U, V, W-phase instruction voltages VU, VV, VW output from the voltage converter 47 by an inter-terminal voltage of the storage battery 30, thereby calculating the U, V, W-phase instruction time ratios Dtu, Dtv, Dtw.

The signal generator 48 generates operation signals gUp, gUn, gVp, gVn, gWp, gWn for the switches SUp, SUn, SVp, SVn, SWp, SWn based on the calculated U, V, W phase instruction time ratios Dtu, Dtv, Dtw. The operation signal is either an ON instruction or an OFF instruction. The upper arm operation signal and the lower arm operation signal of the same phase do not simultaneously become an ON instruction. The signal generator 48 outputs the generated operation signals gUp to gWn to the switches SUp to SWn that constitute the inverter 20. The switching modes of the switches SUp to SWn are determined by the operation signals gUp to gWn.

The signal generator 48 generates an operation signal by PWM (Pulse Width Modulation) based on a magnitude comparison between the instruction time ratio and a carrier signal SigC in each of the three phases. In the present embodiment, the carrier signal SigC is a triangular wave signal in which a gradual increase speed and a gradual decrease speed are equal to each other.

The speed estimator 49 calculates the estimated angular speed ωest. In the present embodiment, the speed estimator 49 calculates the estimated angular speed ωest based on the γ axis current Iγr and the δ axis current Iδr calculated by the current converter 43 and the γ axis instruction voltage Vγ* and the δ axis instruction voltage Vδ* calculated by the current controller 46 for performing the feedback control of the estimation error Δθ to/toward 0 Here, for example, a method of calculating the estimated angular speed ωest using an extended induced voltage may be used.

The angle estimator 50 time-integrates the estimated angular speed ωest calculated by the speed estimator 49 to calculate the estimated angle θest.

The current calculator 51 calculates the U, V, W phase currents IU, IV, IW based on inter-terminal voltages VIU, VIV, VIW of the U, V, W phase shunt resistors 23U, 23V, 23W. In the present embodiment, the current calculator 51 uses a timing at which the carrier signal SigC reaches its maximum value as the detection timing (i.e., a current detection timing) of the inter-terminal voltages VIU, VIV, VIW. The current calculator 51 samples and holds each of the inter-terminal voltages VIU, VIV, VIW by using a sample-and-hold circuit, and converts each of the inter-terminal voltages VIU, VIV, VIW as a sampled analog data into digital data by using an AD converter. The current calculator 51 calculates the U, V, W phase currents IU, IV, IW based on the converted digital data.

As shown in FIG. 4, the phase current flows in the shunt resistor during an ON period of the lower arm switch according to the voltage vectors V0 to V6. In the present embodiment, when the potential of the first end of the shunt resistor is higher than the potential of the second end thereof, a sign of the inter-terminal voltage of the shunt resistor is defined as positive. Further, with regard to the actual phase current, the direction of the current flowing from the inverter 20 to the rotating electric machine 10 is defined as positive. Therefore, in the column of arm current (i.e., ARM) in FIG. 4, a negative sign (i.e., a minus "−" sign) is attached when the sign of the inter-terminal voltage of the shunt resistor is different from the sign of the actual phase current. In FIG. 4, V1 to V6 are first to sixth vectors serving as active voltage vectors, and V0 and V7 are zeroth and seventh vectors serving as reactive voltage vectors.

Subsequently, the number of phases in which the electric current is detectable in case where a modulation ratio is 1 or less is described with reference to FIGS. 5A to 5D. The modulation ratio is a value obtained by dividing an amplitude of the instruction time ratio by an amplitude of the carrier signal SigC. Therefore, when the amplitude of the instruction time ratio and the amplitude of the carrier signal SigC are equal, the modulation ratio is 1.

Figure 5A:
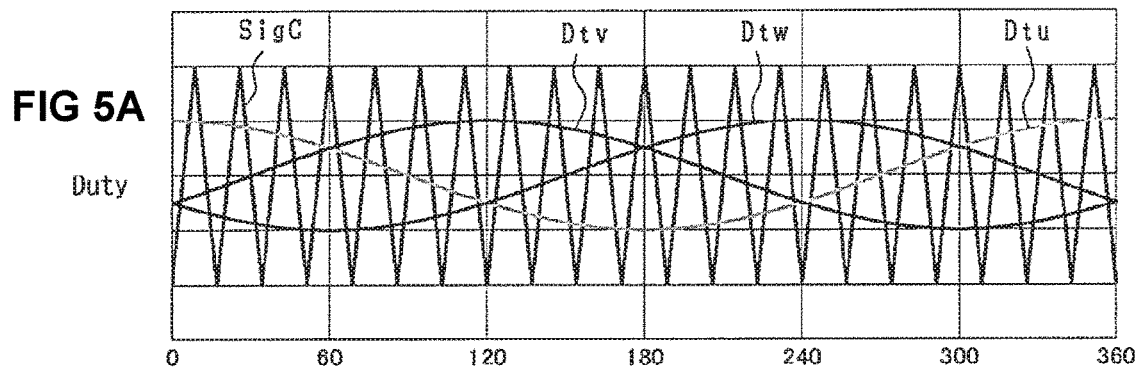
FIG. 5A is a time chart of transition of instruction time ratio when a modulation ratio is 1 or less.
Figure 5B:
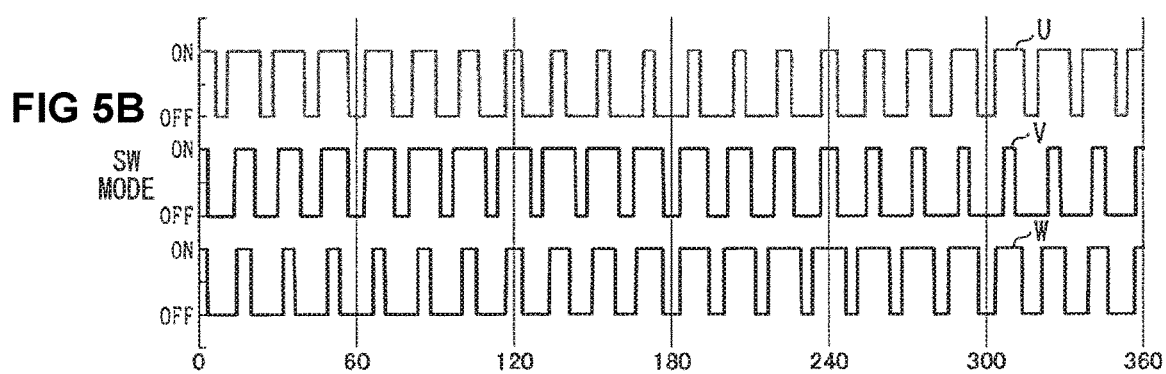
FIG. 5B is a time chart of transition of switching mode when a modulation ratio is 1 or less.

FIG. 5A shows transition of each of the phase instruction time ratios Dtu, Dtv, Dtw, and FIG. 5B shows transition of the switching mode of each of the switches SUp to SWn. In FIG. 5B, for example, regarding the U phase, ON indicates that the U-phase upper arm operation signal gUp is an ON instruction and the U-phase lower arm operation signal gUn is an OFF instruction. Further, OFF, in FIG. 5B, indicates that the U-phase upper arm operation signal gUp is an OFF instruction and the U-phase lower arm operation signal gUn is an ON instruction.

Figure 5C:
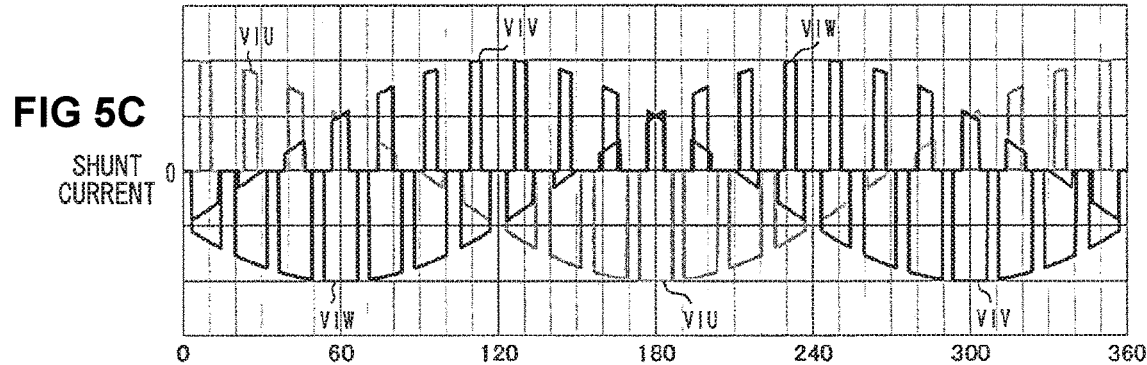
FIG. 5C is a time chart of transition of inter-terminal voltages when a modulation ratio is 1 or less.
Figure 5D:
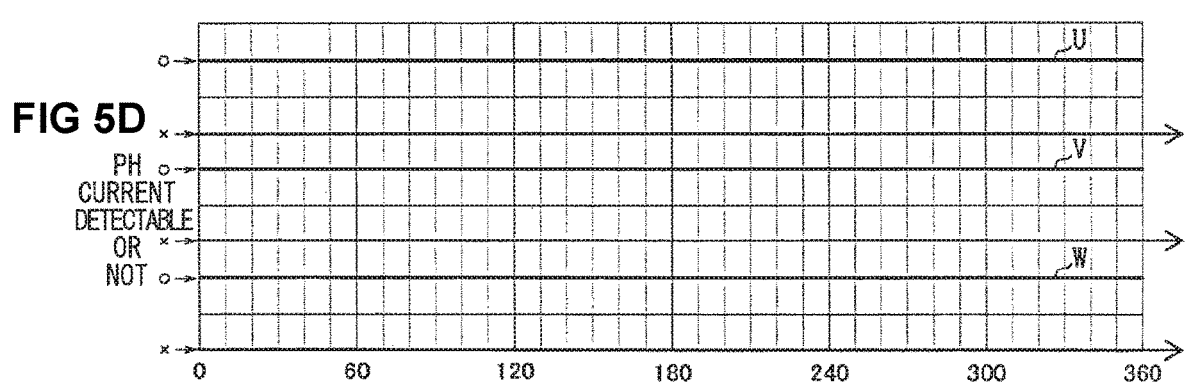
FIG. 5D is a time chart indicating whether phase current is detectable when a modulation ratio is 1 or less.
Figure 6A:
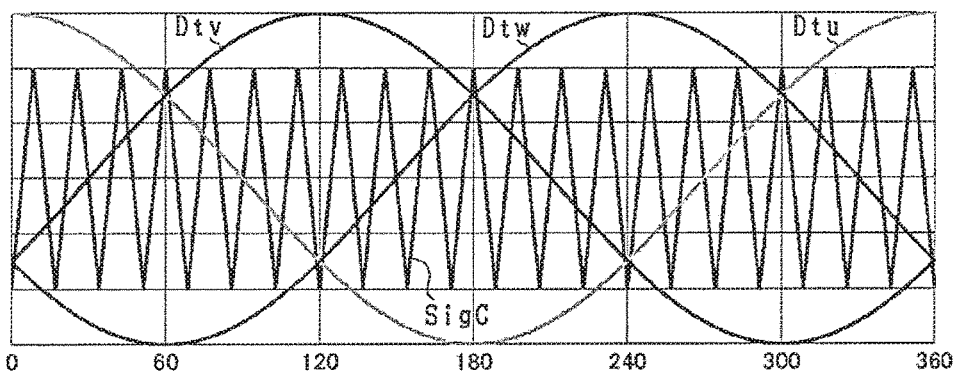
FIG. 6A is a time chart of transition of instruction time ratio when the modulation ratio is greater than 1.
Figure 6B:
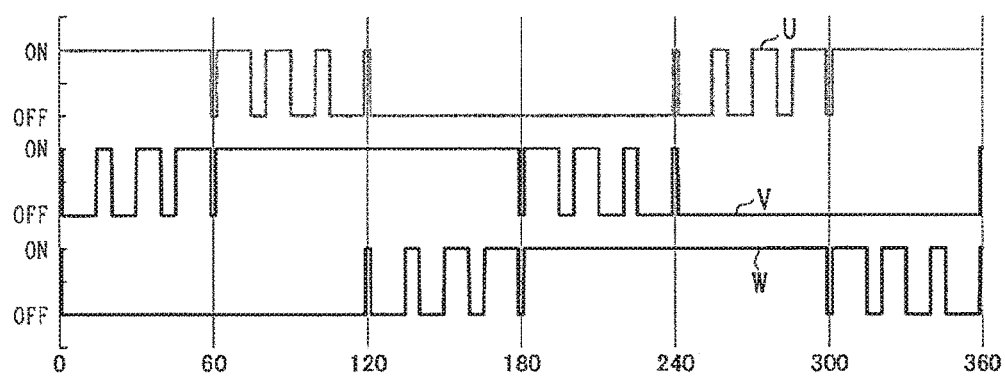
FIG. 6B is a time chart of transition of switching mode when the modulation ratio is greater than 1.
Figure 6C:
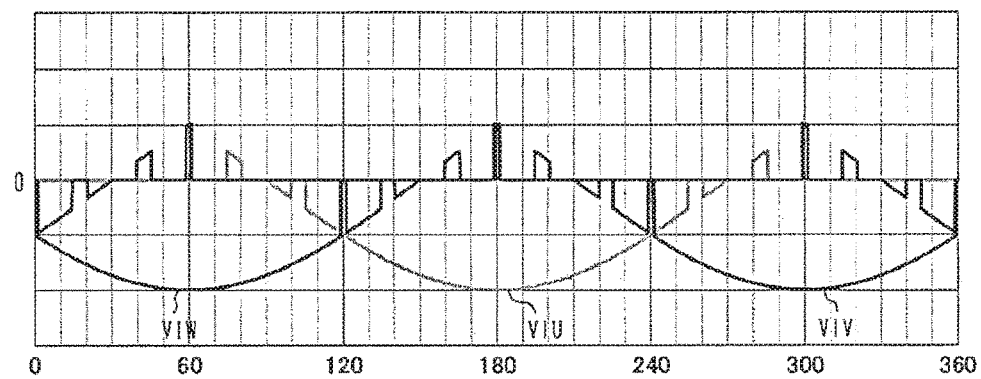
FIG. 6C is a time chart of transition of inter-terminal voltages when the modulation ratio is greater than 1.
Figure 6D:
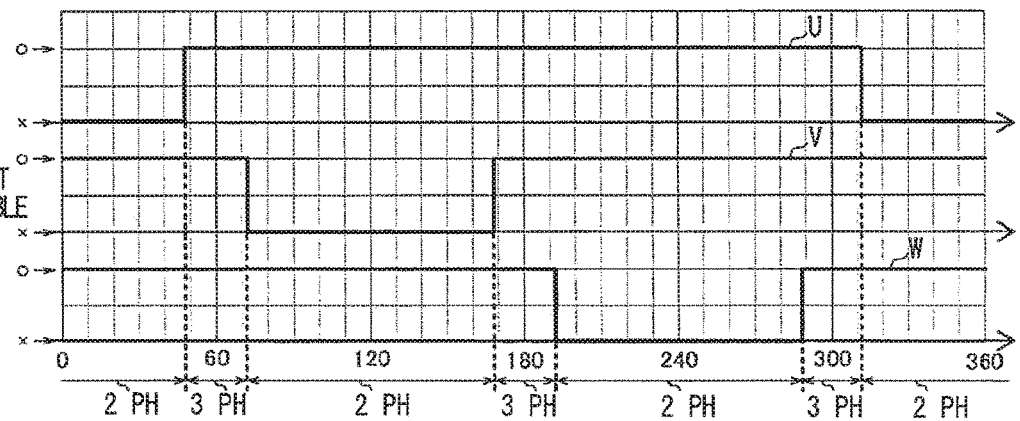
FIG. 6D is a time chart indicating whether phase current is detectable when the modulation ratio is greater than 1.
Figure 7A:
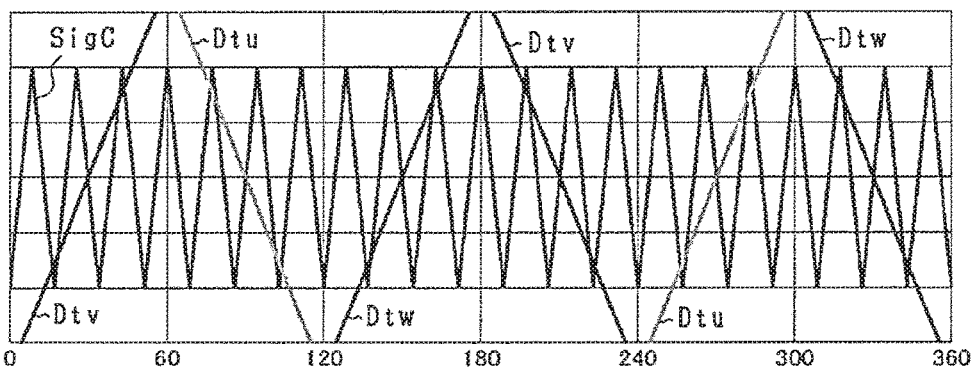
FIG. 7A is a time chart of transition of instruction time ratio when the modulation ratio is greater than 1 according to a comparative example.
Figure 7B:
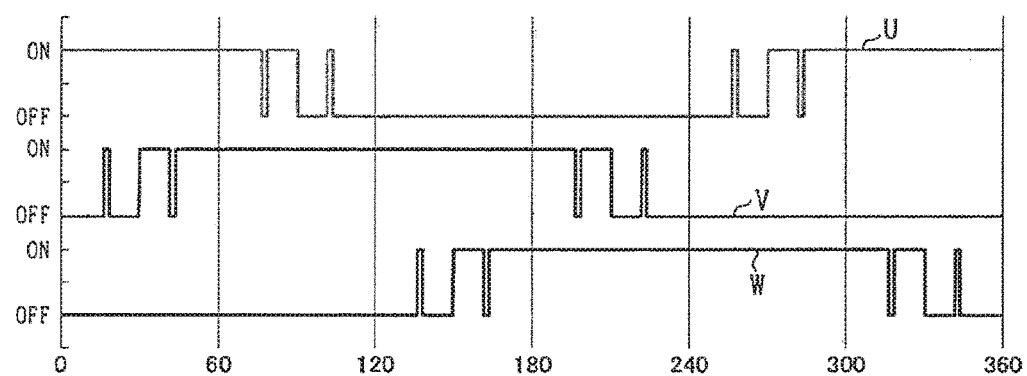
FIG. 7B is a time chart of transition of switching mode when the modulation ratio is greater than 1 according to a comparative example.
Figure 7C:
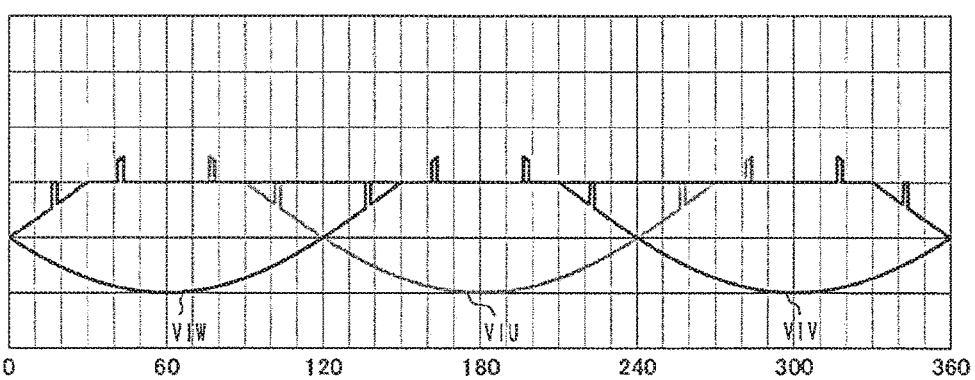
FIG. 7C is a time chart of transition of inter-terminal voltages when the modulation ratio is greater than 1 according to a comparative example.
Figure 7D:
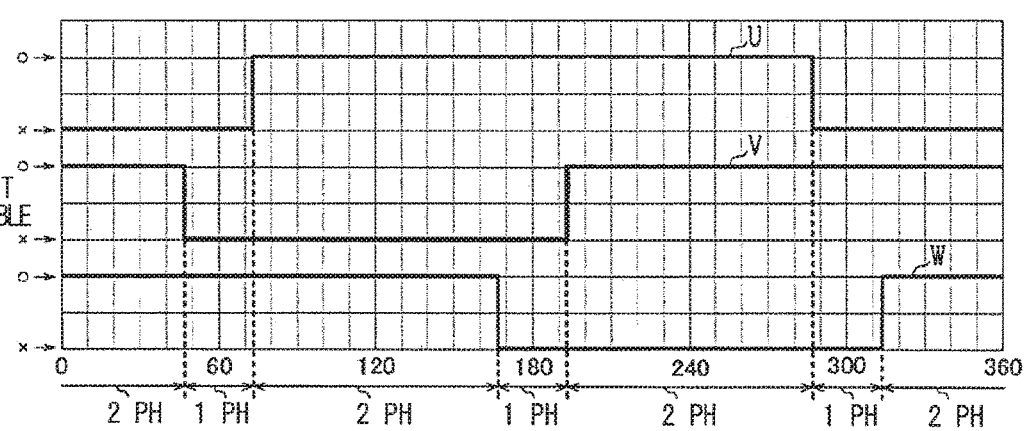
FIG. 7D is a time chart indicating whether phase current is detectable when the modulation ratio is greater than 1 according to a comparative example.

FIG. 5C shows transition of the inter-terminal voltages VIU, VIV, VIW respectively detected with the shunt resistors 23U, 23V, 23W, and FIG. 5D shows transition of whether the phase current is detectable in the U, V, W phases. In FIG. 5D, "o" indicates that the phase current is detectable, and "x" indicates that the phase current is not detectable. Further, in FIG. 5D, "o" is shown when each of the cycles of the carrier signal SigC includes a period of a zeroth vector V0.

As shown in FIGS. 5A to 5D, in case where the modulation ratio is 1 or less, a period of the zeroth vector V0 is included in each of the cycles of the carrier signal SigC, the phase current is detectable in (i.e., all through) one electric angle cycle for the three phases. Thus, the current calculator 51 detects the inter-terminal voltages VIU, VIV, VIW for three phases at respective timings of having the carrier signal SigC reaching its maximum value, and, upon detecting the inter-terminal voltages VIU, VIV, VIW, calculates one of the phase currents IU, IV, IW at those timings. Based on the calculated phase currents IU, IV, IW, the control amount of the rotating electric machine 10 is controlled and the estimated angle θest is calculated.

Subsequently, the number of phases in which the phase current is detectable at a time of over-modulation (i.e., when the modulation ratio exceeds 1) is described with reference to FIGS. 6A to 6D. The phase in which the phase current is detectable may later be referred to as a "current-detectable" phase. In case of over-modulation, a peak value of the instruction time ratio exceeds a peak value of the carrier signal SigC. FIGS. 6A to 6D correspond to FIGS. 5A to 5D described above.

In an example shown in FIGS. 6A to 6D, the phase current is detectable for two or three phases in one electric angle cycle. In a period in which the phase current is detectable in two phases, the current calculator 51 calculates a remaining phase current using a relationship of "IU+IV+IW=0" based on the phase currents already detected in two phases. Then, based on the calculated phase currents IU, IV, IW, the control amount of the rotating electric machine 10 is controlled, and the estimated angle θest is calculated.

Here, when the modulation ratio is further increased, the phase current is detectable only in one phase or only in two phases in one electric angle cycle.

FIGS. 7A to 7D respectively show a comparative example in which the phase current is detectable only in one phase or only in two phases. FIGS. 7A to 7D correspond to FIGS. 6A to 6D described above.

As shown in FIGS. 7A to 7D, in a period in which the phase current is detectable only in one phase, the phase current for the remaining two phases cannot be calculable by using the relationship of "IU+IV+IW=0," and control of the rotating electric machine 10 is not performable.

Note that, when the modulation ratio further goes up than the value shown in FIGS. 7A to 7D, single pulse control is performed, in which (i) switching to the ON operation for each of the switches in the upper and lower arms in each phase appears once in one electric angle cycle, and (ii) the timing of switching to the ON operation shifts by 120 degrees from one phase to the other, among the three phases.

A situation where the phase current is detectable only in one phase is caused not only by the modulation ratio of far greater than 1 but also by abnormality of the phase current detection function provided in a control system. Such an abnormality includes abnormality of at least one of the sample-and-hold circuit and the AD converter that constitute the current calculator 51.

In order to cope with such a situation in which the phase current is detectable only in one phase, the process shown in FIG. 8 is performed in the present embodiment. This process is repeatedly performed, for example, in every predetermined control cycle cooperatively by the current calculator 51, a filter 52, a converter 53, and the like of the controller 40.

At step S10, the inter-terminal voltages VIU, VIV, VIW of the U, V, W-phase shunt resistors 23U, 23V, 23W are sampled and held ("SH" means "sample-hold" at step S10 in FIG. 8).

At step S11, it is determined whether an abnormality has occurred in the phase current detection function of the control system. In the present embodiment, it is assumed that abnormality of the detection function is determinable as to be occurring in which one of the three phases. Since it is not a key feature of the present disclosure, details of the detection method (i.e., how to detect abnormality of the phase current detection function) are omitted from the description.

First, a situation of having no abnormality determination at step S11 is described. At step S12, an ON operation period Ton of each of the U, V, W-phase lower arm switches SUn, SVn, SWn per one cycle of the carrier signal SigC is respectively calculated based on the U, V, W-phase instruction time ratios Dtu, Dtv, Dtw.

At step S13, based on the ON operation period Ton of each of the U, V, W phases calculated at step S12, it is determined how many phases have detectable phase current. In the present embodiment, the number of phase current detectable phases is determined as a count of the phases in which the ON-operation period Ton is longer than a ringing occurrence period Tsta. The ringing occurrence period Tsta is a period from a switching of the switching mode of each of the switches SUp to SWn to an end of ringing, i.e., to a convergence of ringing of the electric current flowing in the shunt resistor, which is caused by the switching of the switching mode. When the current detection timing is set within the ringing occurrence period Tsta, the detection accuracy of the phase current is deteriorated.

At step S14, it is determined, based on a determination result of step S13, whether or not the number of phases in which the phase current is detectable is three.

When it is determined at step S14 that there are three current-detectable phases (i.e., YES), the process proceeds to step S15, and the current calculator 51 calculates the U, V, W-phase currents IU, IV, IW based on the sample-held inter-terminal voltages VIU, VIV, VIW of the U, V, W-phase shunt resistors 23U, 23V, 23W.

When a negative determination is made at step S14 (i.e., NO), the process proceeds to step S16, and it is determined, based on the determination result of step S13, whether the number of current-detectable phases is two.

When it is determined at step S16 that there are two current-detectable phases, the process proceeds to step S17, and the current calculator 51 calculates the phase current for two phases based on the inter-terminal voltages of the current-detectable two phases from among the sample-held three inter-terminal voltages VIU, VIV, VIW of the U, V, W-phase shunt resistors 23U, 23V, 23W. Then, based on the calculated phase current for two phases, the remaining phase current is calculated by using the relationship of "IU+IV+IW=0."

When a negative determination is made at step S16 (i.e., NO), the process proceeds to step S18, and it is determined whether the number of the current-detectable phases is 1, based on the determination result of step S13.

When it is determined at step S18 that there is one current-detectable phase, the process proceeds to step S19, and, based on $\gamma$ and $\delta$ axis filter currents I$\gamma$f and I$\delta$f in a previous control cycle and the estimated angle $\theta$est calculated in the current (i.e., present) control cycle, the converter 53 calculates U, V, W-phase estimated currents IUes, IVes, IWes of the UVW coordinate system. The $\gamma$ and $\delta$ axis filter currents I$\gamma$f and I$\delta$f in the previous control cycle are current values obtained by the filter 52 with low pass filtering of the $\gamma$ and $\delta$ axis currents I$\gamma$r and I$\delta$r calculated by the current converter 43 in the previous control cycle. The $\gamma$ and $\delta$ axis currents I$\gamma$r and I$\delta$r calculated in the previous control cycle correspond to a past current value.

In the subsequent step S20, the current calculator 51 calculates a phase current of one phase based on the inter-terminal voltage of the current-detectable one phase from among the sample-held, three inter-terminal voltages VIU, VIV, VIW of the shunt resistors 23U, 23V, 23W. Further, from among the phase currents for three phases, the phase currents for two phases that cannot be calculable based on the inter-terminal voltage of the shunt resistor are set as the estimated currents calculated at step S19. For example, when only the U-phase current IU among the three phases can be calculable based on the inter-terminal voltage VIU of the U-phase shunt resistor 23U, the V-phase estimated current IVes is used as a V-phase current IV that is output to the current converter 43, and the W-phase estimated current IWes is used as a W-phase current IW that is output to the current converter 43.

When a negative determination is made at step S18, it is determined that there is no current-detectable phase, and the process proceeds to step S21. At step S21, the same process as step S19 is performed. In the subsequent step S22, the U-phase current IU output to the current converter 43 is set as the U-phase estimated current IUes, the V-phase current IV output to the current converter 43 is set as the V-phase estimated current IVes, and the W-phase current IW output to the current converter 43 is set as the W-phase estimated current IWes.

In the present embodiment, the process of step S11 to S14, S16 serves as a determiner. Further, the components 41 to 53 in the block diagram of FIG. 2 constitute a driver.

Figure 9A:
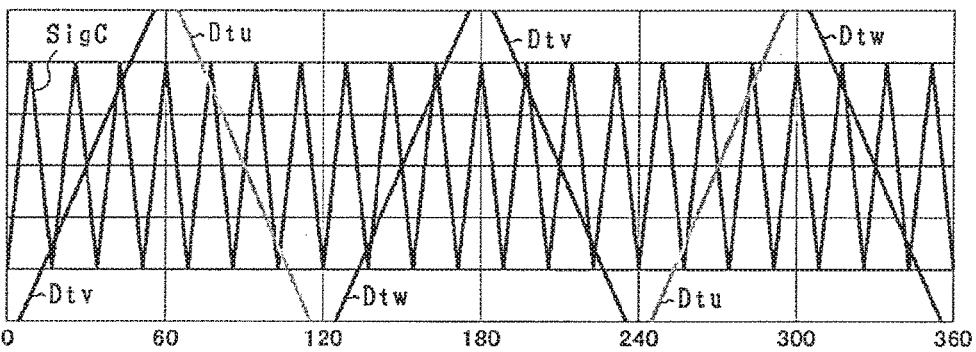
FIG. 9A is a time chart involving an explanation of current estimation process when only one phase current is detectable due to a control state.
Figure 9B:
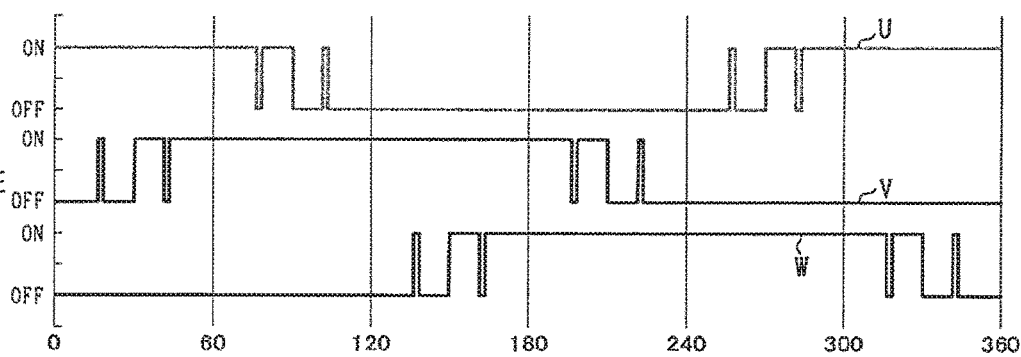
FIG. 9B is a time chart involving an explanation of switching mode when only one phase current is detectable due to a control state.
Figure 9C:
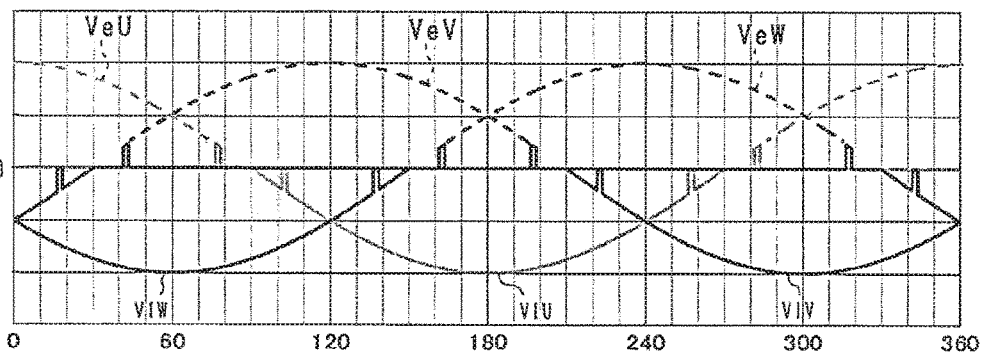
FIG. 9C is a time chart involving an explanation of inter-terminal voltages when only one phase current is detectable due to a control state.
Figure 9D:
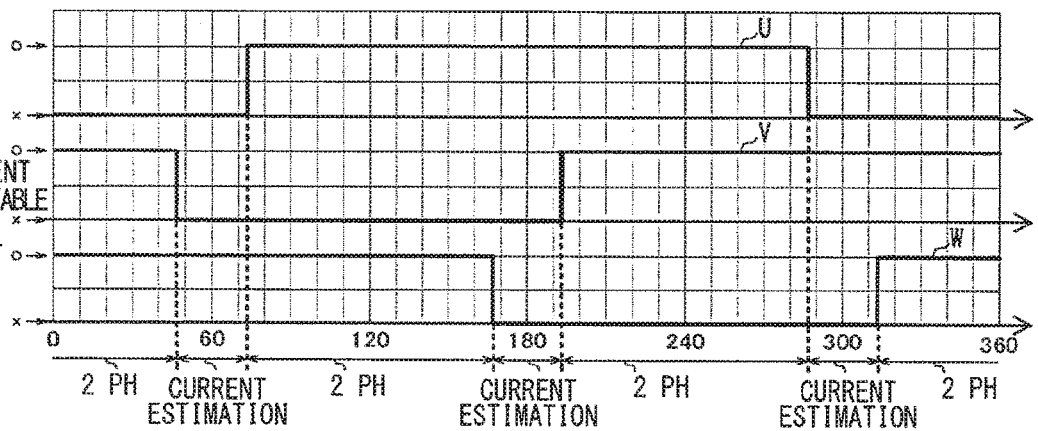
FIG. 9D is a time chart involving an explanation of phase current detection when only one phase current is detectable due to a control state.

FIGS. 9A to 9D respectively show a process of the present embodiment corresponding to the comparative example described with reference to FIGS. 7A to 7D. FIGS. 9A to 9D correspond to FIGS. 7A to 7D described above. In FIG. 9C, inter-terminal voltages VeU, VeV, VeW respectively corresponding to the U, V, W-phase estimated currents IUes, Ives, IWes are indicated by using broken lines.

According to the present embodiment, when it is determined that the phase current is detectable only in one of the three phases, the estimated current is calculated for the phases determined to be undetectable. That is, as indicated by broken lines in FIG. 9C, the phase current is grasped for all three phases. Then, the estimated current is used to control the rotating electric machine 10. Thus, even when the phase current is detectable only in one of three phases, control of the rotating electric machine 10 is continuable.

Conventionally, the modulation ratio is restricted so as not to be excessively high, for the purpose of detecting the phase current in at least two phases. In such case, the voltage utilization ratio is limited, resulting in an increase in size/volume of the rotating electric machine 10. However, according to the present embodiment, since it is not necessary to limit the modulation ratio for detecting the phase current in at least two phases, the rotating electric machine 10 may have a smaller size.

Referring back to FIG. 8, a situation of having abnormality determination at step S11 is described. When it is determined at step S11 that an abnormality has occurred, the determinations at steps S14, S16, S18 are made based on (i) the determination result of how many of the three phases are abnormal and (ii) the determination result of step S13. For example, when it is determined that the current detection function for one phase is abnormal, although the phase current is detectable for three phases according to the determination result of step S13, it is then determined that the phase current is actually detectable for two phases. When it is determined at step S11 that an abnormality has occurred, it is desirable for the controller 40 to notify such a determination of abnormality to an upper-hierarchy control device outside thereof.

The process of the present embodiment when an abnormality occurs in the U-phase current detection function is described with reference to FIGS. 10A to 10D FIGS. 10A to 10D correspond to FIGS. 9A to 9D described above. When an abnormality occurs in the U-phase current detection function, the phase current is detectable only in 0 phase or in 1 phase during most of one electric angle cycle. However, according to the present embodiment, as shown by a broken line in FIG. 10C, the phase current is graspable in three phases, thereby control of the rotating electric machine 10 is continuable.

According to the present embodiment, in addition to the effects described above, the effects described below are achievable. When the rotating electric machine 10 is used as a driving power source of a vehicle, reduction in size of the rotating electric machine 10 is a priority, in comparison to the rotating electric machines used in other applications, in order to reserve a greater in-vehicle space. According to the present embodiment, since the rotating electric machine 10 is reducible in size, the in-vehicle space is more widely reservable.

When the rotating electric machine 10 is used to drive an electric pump that constitutes a hydraulic brake device, the device is required to have high responsiveness for emergency braking in automatic driving of the vehicle, together with high reliability thereof, for a non-stop operation, for example. According to the present embodiment, since the phase current of at least two phases is (always) detectable, the control of the rotating electric machine 10 is (more securely) continuable. As a result, the probability of failure of the brake device is reducible, and the reliability of the brake device is improvable.

Modification of First Embodiment

At steps S19 and S21 of FIG. 8, for the calculation of the U, V, W phase estimated currents IUes, Ives, IWes, for example, the γ and δ axis currents Iγr and Iδr calculated by the current converter 43 in a cycle before the previous control cycle may be used, after low-pass filtering of the current values by the filter 52.

Second Embodiment

Figures 11, 12, 13, 14:
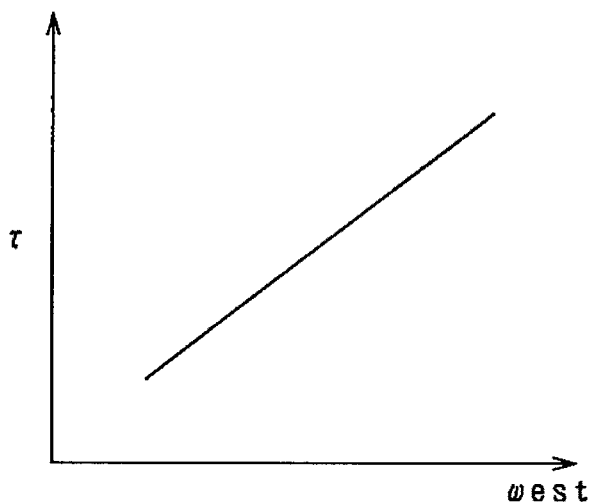
FIG. 11 is a diagram of a method of setting a time constant of a filter according to a second embodiment of the present disclosure.
FIG. 12 is a diagram of a method of setting a time constant of the filter based on an estimated angular speed.
FIG. 13 is a diagram of a method of setting a feedback gain according to a third embodiment of the present disclosure.
FIG. 14 is a diagram of a method of setting a feedback gain according to a modification of the third embodiment of the present disclosure.

The second embodiment is described below with reference to the drawings, in terms of differences from the first embodiment. As shown in FIG. 11, on condition that the controller 40 determines at step S11 of FIG. 8 that no abnormality has occurred in the detection function of the phase current, a time constant T in the low-pass filtering process of the filter 52 is set to have a longer duration in a situation where the number of current-detectable phases is zero or one, than in a situation where the number of current-detectable phases is two or three. Such a setting is for the reduction of the responsiveness of the estimated angular speed ωest which is a control amount. In the present embodiment, the process to reduce the responsiveness corresponds to a processor.

That is, in case of over-modulation, high-order current distortion occurs in the phase current, thereby control of the control amount (i.e., the estimated angular speed ωest) may become unstable. In particular, when single pulse control is performed, the distortion may be significantly recognizable. Therefore, in case of over-modulation, the responsiveness of the control amount is lowered to suppress the influence of the distortion on the control of the control amount, even when the high-order current distortion occurs. As a result, control of the control amount is stabilized, and consequently, the phase current is stably detectable.

In the present embodiment, when the number of current-detectable phases is 0 or 1, the time constant T is increased as the estimated angular speed ωest increases as shown in FIG. 12. The frequency of the high-order current distortion component increases as the electric angular speed increases. Therefore, according to the setting shown in FIG. 12, the control of the control amount is further stabilized.

Modification of Second Embodiment

Instead of using the setting method shown in FIG. 12, the controller 40 may increase the time constant T stepwise as the estimated angular speed ωest increases. More practically, the controller 40 may set the time constant T in two or three stages, for example.

Third Embodiment

The third embodiment is described below with reference to the drawings, in terms of differences from the second embodiment. In the present embodiment, the responsiveness of the control amount is changed by variably setting a feedback gain used in the current controller 46 instead of changing the time constant T of the filter 52. More practically, as shown in FIG. 13, when the number of current-detectable phases is 0 or 1 as shown in FIG. 13, the controller 40 sets a smaller value as the feedback gain used in the current controller 46, such as proportional gain, integral gain or the like, in a situation where the number of current-detectable phases is zero or one, than in a situation where the number of current-detectable phases is two or three.

Note that, when the number of current-detectable phases is 0 or 1, the controller 40 may set the feedback gain used in the speed estimator 49 to a smaller value as the estimated angular speed ωest increases.

Modification of Third Embodiment

Instead of changing the feedback gain used in the current controller 46, the feedback gain used in the speed estimator 49 may be variably set as shown in FIG. 14. More practically, when the number of current-detectable phases is 0 or 1, the controller 40 uses a smaller feedback gain in the speed estimator 49 than in a situation where the number of current-detectable phases is 2 or 3. Note that, when the number of current-detectable phases is 0 or 1, the controller 40 may set the feedback gain used in the speed estimator 49 to a smaller value as the estimated angular speed ωest increases.

Fourth Embodiment

The fourth embodiment is described below with reference to the drawings, in terms of differences from the first embodiment. In the present embodiment, when the number of phases in which the phase current is detectable is one or less (i.e., zero), the speed estimator 49 stops the process of calculating the estimated angular speed ωest. Then, the angle estimator 50 calculates the estimated angle θest in the current control cycle based on the estimated angular speed ωest calculated in the previous control cycle.

Figure 15:
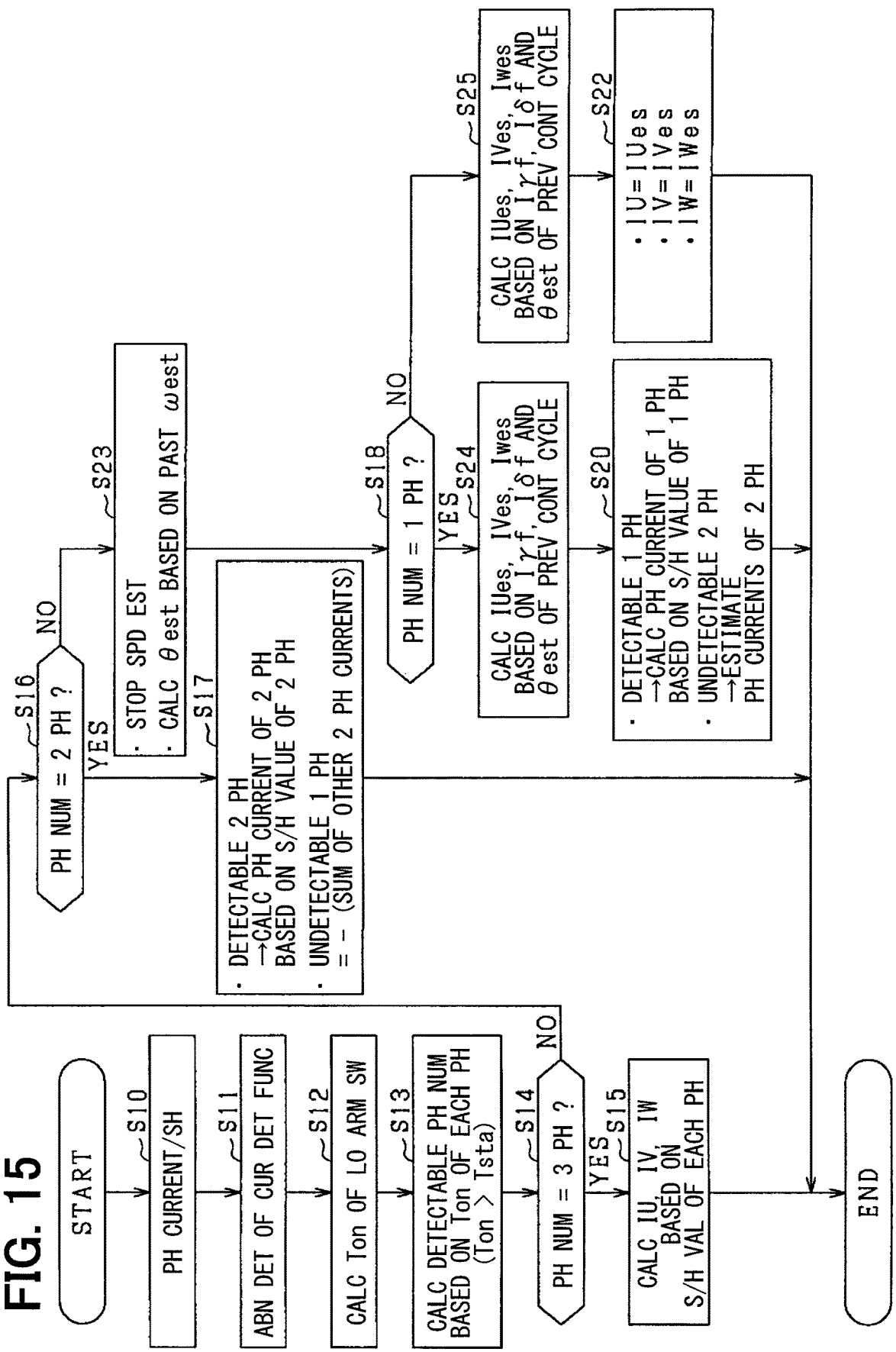
FIG. 15 is a flowchart of a procedure of fail-safe process performed by the control device according to the third embodiment of the present disclosure.

FIG. 15 shows the procedure of process performed in the controller 40 according to the present embodiment. This process is repeatedly performed, for example, in every predetermined control cycle. In FIG. 15, the same process as shown in FIG. 8 has the same number, for the ease of understanding.

When a negative determination is made at step S16, the process proceeds to step S23, and the calculation process of the estimated angular speed ωest in the speed estimator 49 is stopped. Then, the angle estimator 50 calculates the estimated angle θest in the current control cycle based on the estimated angular speed ωest calculated in the past. An example of such calculation method is described below. First, a differential speed ΔA of the estimated angular speed ωest is calculated based on the estimated angular speed ωest[n−1] calculated in the previous control cycle and the estimated angular speed ωest[n−2] calculated in the control cycle before the previous cycle. For example, when the control cycle is Δt, the differential speed ΔA is calculated by (ωest[n−1]−ωest[n−2])/Δt. Then, by adding "ΔA×Δt" to the estimated angular speed ωest[n−1] calculated in the previous control cycle, the estimated angular speed ωest[n] in the current control cycle is derived. Then, the estimated angular speed ωest[n] thus estimated is used to calculate the estimated angle θest in the current control cycle.

In the present embodiment, the estimated angle θest used at steps S24 and S25 is the estimated angle θest calculated at step S23. In addition, when a positive determination is made at step S16, the calculation process of the estimated angular speed ωest is restarted.

According to the present embodiment described above, even when the phase currents of two or more phases are not detectable, the calculation of the estimated angle θest is stably performable. Thereby, the control of the rotating electric machine 10 is stabilized.

Fifth Embodiment

Figure 16:
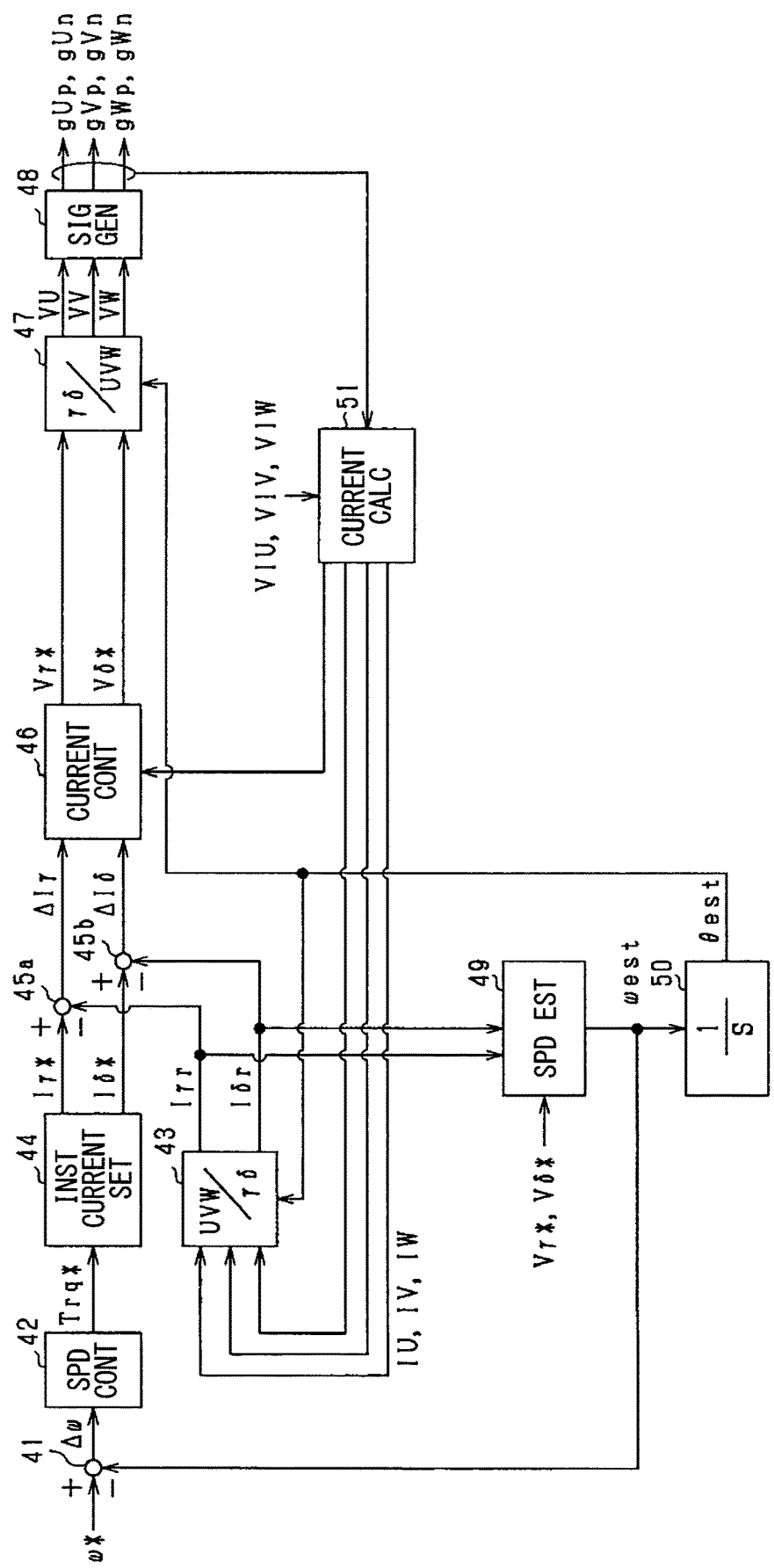
FIG. 16 is a block diagram of the control device according to a fifth embodiment of the present disclosure.

The fifth embodiment is described below with reference to the drawings, in terms of differences from the first embodiment. In the present embodiment, the process in a situation where the number of current-detectable phases is one or less is changed. Along with such change, the controller 40 does not include the filter 52 and the converter 53, as shown in FIG. 16. In FIG. 16, the same configuration as shown in FIG. 2 has the same number, for the ease of understanding.

Figure 17:
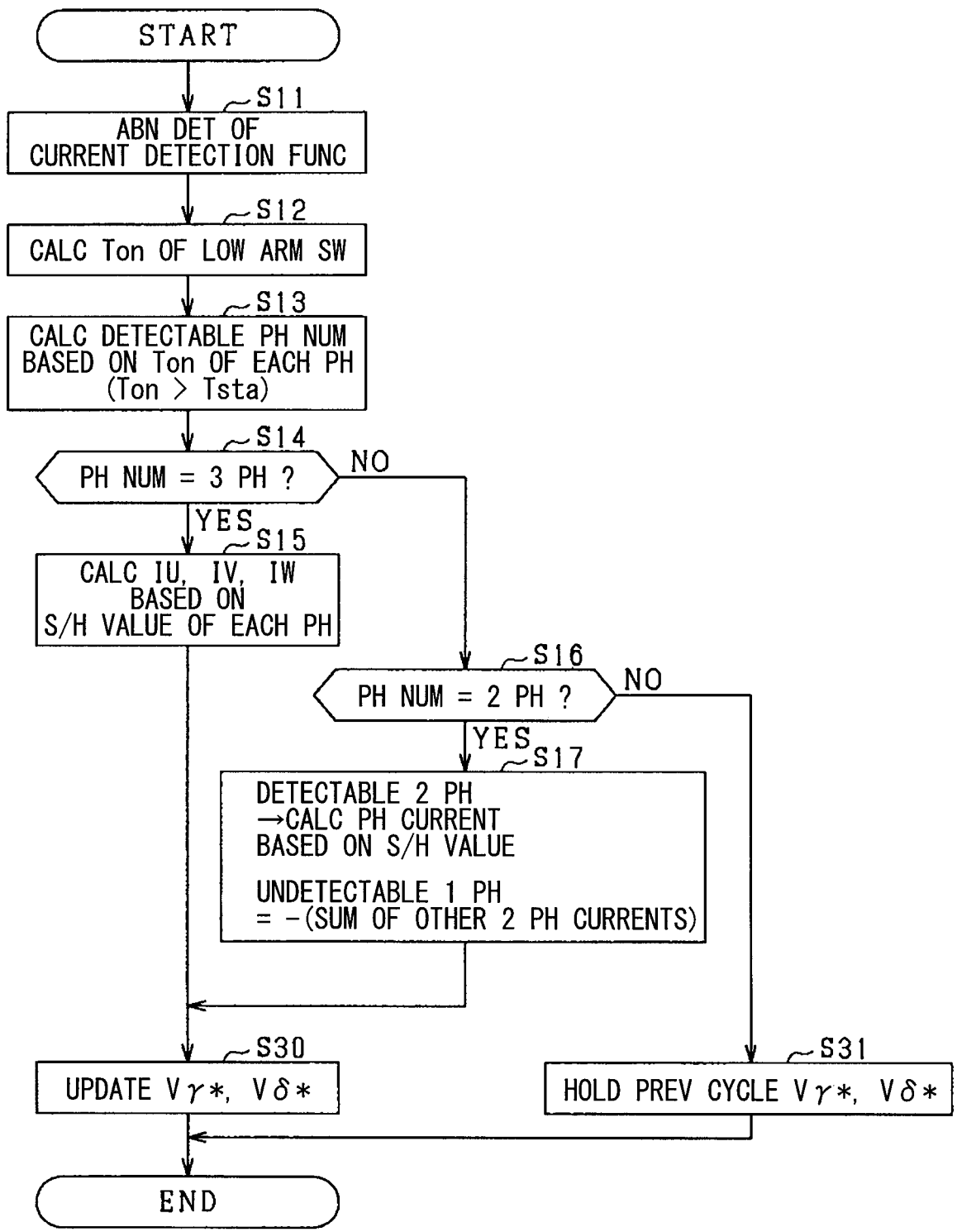
FIG. 17 is a flowchart of a procedure of a process performed by the control device.

The procedure of the process performed in the controller 40 according to the present embodiment is shown in FIG. 17. This process is repeatedly performed, for example, in every predetermined control cycle. In FIG. 17, the same process as shown in FIG. 8 has the same number, for the ease of understanding.

After determining whether there is an abnormality in the phase current detection function at step S11, the process proceeds to step S14 via steps S12 and S13. When it is determined at step S14 that the phase current is detectable in three phases, the process proceeds to step S30 via step S15. At step S30, the current controller 46 calculates and updates the γ and δ axis instruction voltages Vγ* and Vδ*.

When it is determined at step S16 that the phase current is detectable in two phases, the process proceeds to step S30 via step S17.

When a negative determination is made at step S16, the process proceeds to step S31, and the γ and δ axis instruction voltages Vγ* and Vδ* calculated in the previous control cycle are used in the current control cycle. That is, the same γ and δ axis instruction voltages Vγ* and Vδ* are used in the previous control cycle and the current control cycle. The γ and δ axis instruction voltages Vγ* and Vδ* calculated in the previous control cycle correspond to a past voltage value.

The present embodiment described above also achieves the similar effects as the first embodiment.

Sixth Embodiment

Figure 18:
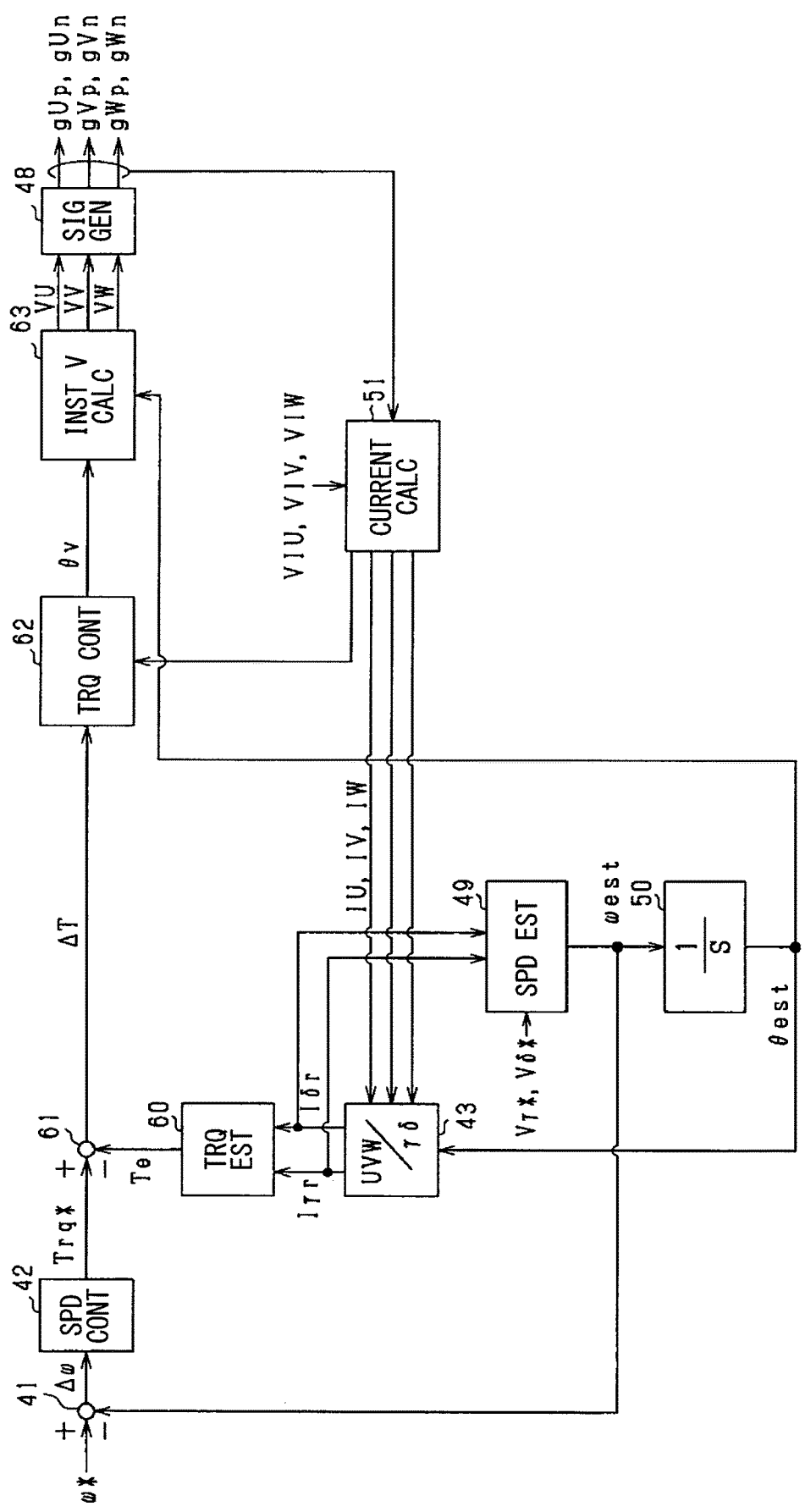
FIG. 18 is a block diagram of a process performed by the control device according to a sixth embodiment of the present disclosure.

The six embodiment is described below with reference to the drawings, in terms of differences from the fifth embodiment. In the present embodiment, the controller 40 performs a phase control as shown in FIG. 18. In FIG. 18, the same configuration as shown in FIG. 16 has the same number, for the ease of understanding.

A torque estimator 60 calculates an estimated torque Te, which is an estimation value of the torque of the rotating electric machine 10, based on the γ axis current Iγr and the δ axis current Iδr calculated in the current converter 43. The estimated torque Te may be calculated based on, for example, map information or a mathematical equation information which associates the γ axis current Iγr and the δ axis current Iδr with the estimated torque Te.

A torque deviation calculator 61 calculates a torque deviation ΔT by subtracting the estimated torque Te from the instruction torque Trq*.

A torque controller 62 calculates a voltage phase θv, which is a phase of a voltage vector, as an operation amount for feedback controlling the estimated torque Te to the instruction torque Trq* based on the torque deviation ΔT. As the feedback control in the torque controller 62, proportional integral control may be used, for example. In the present embodiment, the voltage phase θv corresponds to a voltage instruction value.

An instruction voltage calculator 63 calculates the U, V, W-phase instruction voltages VU, VV, VW whose phases are shifted by 120° from each other in the electric angle based on the calculated voltage phase θv. The calculated U, V, W-phase instruction voltages VU, VV, VW are used in the signal generator 48.

In the present embodiment, when a negative determination is made at step S16 of FIG. 15, the controller 40 may use the voltage phase θv calculated in the previous control cycle in the current control cycle.

The present embodiment described above also achieves the similar effects as the fifth embodiment.

Other Embodiments

The position of U-phase shunt resistor 23U is not limited to the one shown in FIG. 1, but may also be, for example, a position between the drain of the U-phase lower arm switch SUn and the first end of the U-phase conductive member 21U. The same applies to the V-phase shunt resistor 23V and the W-phase shunt resistor 23W.

Figure 19:
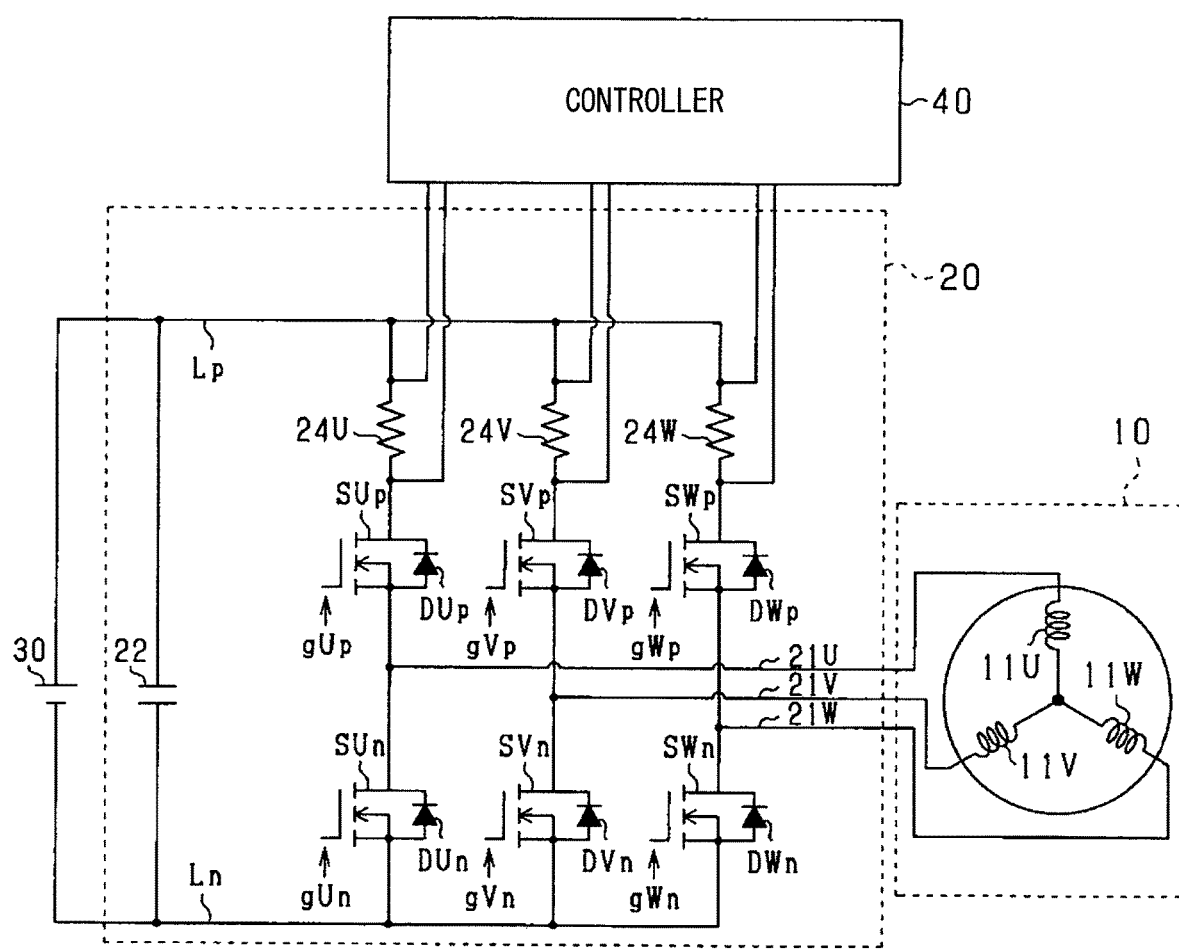
FIG. 19 is a diagram of a configuration of the control system according to other embodiments of the present disclosure.

As shown in FIG. 19, the shunt resistor may be positioned on the upper arm side. In FIG. 19, the same configuration as shown in FIG. 1 has the same number, for the ease of understanding. The first ends of U, V, W-phase shunt resistors 24U, 24V, 24W are connected to the drains of the U, V, W-phase upper arm switches SUp, SVp, SWp. The second ends of the U, V, W-phase shunt resistors 24U, 24V, 24W and the positive electrode terminal of the storage battery 30 are connected by the positive electrode side bus Lp.

In such a case, as shown in FIG. 20, a phase current flows in the shunt resistor during the ON period of the upper arm switch according to the voltage vectors V1 to V7. Therefore, the current detection timing may be set to, for example, a timing at which the carrier signal SigC has the minimum value.

In the configuration shown in FIG. 19, the U-phase shunt resistor 24U may be provided, for example, at a position between the source of the U-phase upper arm switch SUp and the first end of the U-phase conductive member 21U. The same applies to the V-phase shunt resistor 24V and the W-phase shunt resistor 24W.

The carrier signal used in the signal generator 48 is not limited to the triangular wave signal, but may also be, for example, a sawtooth wave signal.

The instruction signal to be compared with the carrier signal is not limited to the instruction time ratio, but may also be the instruction voltage. In such a case, the amplitude of the carrier signal may be variably set according to the magnitude of the amplitude of the instruction voltage.

The signal generator 48 may generate the operation signals gUp to gWp by using space vector modulation (SVM) instead of using PWM.

The control system may have an angle detector. In such a case, the two-phase rotating coordinate system of the rotating electric machine is a dq coordinate system, and the electric angle θ detected by the angle detector is used in the current converter 43, the voltage converter 47, and the like. Further, in such a case, the rotating electric machine may be a non-salient pole machine such as Surface Permanent Magnet Synchronous Motor (SPMSM).

The two-phase rotating coordinate system may be a coordinate system having a first axis extending in the direction of the voltage vector of the inverter from the origin of the coordinate system and a second axis orthogonal to the first axis.

In FIG. 8, FIG. 15, FIG. 17, the process of step S11 is not required.

The switch constituting the inverter is not limited to the MOSFET, but may also be, for example, an IGBT. In such a case, the high potential side terminal of the switch is a collector and the low potential side terminal of the switch is an emitter. In addition, a free wheel diode is connected in antiparallel with the switch.

Further, the switch constituting the inverter 20 is not limited to the voltage control type, but may also be a current control type such as a bipolar transistor or the like.

The control amount of the rotating electric machine is not limited to the rotation speed, but may also be, for example, a torque.

The rotating electric machine is not limited to the star-connection type, but may also be the Δ-connection type. Further, the rotating electric machine is not limited to a permanent magnet synchronous machine, but may also be, for example, a winding field type synchronous machine or a synchronous reluctance motor.

What is claimed is:

1. A controller of a rotating electric machine applied to a system including:
   an inverter having one switch for each of upper and lower arms in three phases;
   a synchronous rotating electric machine having windings electrically connected to the inverter; and
   three shunt resistors located to detect three phase currents, the controller comprising:
   a driver performing a control on a control amount of the rotating electric machine, when the shunt resistors in at least two phases have an electric current flowing therein, by (a) calculating a voltage instruction value for controlling the control amount of the rotating electric machine based on voltage detection values of the shunt resistors in the at least two phases and (b) performing a drive control of each switch in the inverter based on the calculated voltage instruction values; and
   a determiner determining whether a phase current flowing in the windings is detectable in the at least two phases among the three phases based on the voltage detection values of the shunt resistors, wherein
   the driver performs the drive control of a present control cycle of each switch based on past current values or past voltage values, which are calculated in a previous control cycle, in a two-phase rotating coordinate system of the rotating electric machine when the determiner determines that the phase current is not detectable in the at least two phases.

2. The controller of a rotating electric machine of claim 1, wherein
   the determiner determines whether the phase current is detectable in the at least two phases based on the voltage instruction value calculated based on the voltage detection value of the shunt resistor.

3. The controller of a rotating electric machine of claim 1, wherein
   the driver includes a processor that performs a process that lowers a responsiveness of the control amount when the determiner determines that the phase current is not detectable in the at least two phases, and lowering of the responsiveness of the control amount is made greater when the determiner determines that the phase current is not detectable in the at least two phases than when the determiner determines that the phase current is detectable in the at least two phases.

4. The controller of a rotating electric machine of claim 1, further comprising:
   an estimator (i) estimating an electric angular speed of the rotating electric machine based on the current value in the two-phase rotating coordinate system calculated based on the voltage detection value of the shunt resistor, and (ii) calculating a magnetic pole position of the rotating electric machine based on the estimated electric angular speed, for a feedback control of zeroing an estimation error of the magnetic pole position of the rotating electric machine, wherein
   the driver uses the calculated magnetic pole position in the drive control, and
   the estimator stops the estimation of the electric angular speed, and calculates the magnetic pole position used in the drive control based on the electric angular speed estimated in the past when the determiner determines that the phase current is not detectable in the at least two phases.

5. The controller of a rotating electric machine of claim 2, wherein
   the determiner determines whether the phase current is detectable in the at least two phases based on whether a phase current detection function is abnormal in each phase of the system in addition to the voltage instruction value.

6. The controller of a rotating electric machine of claim 3, wherein
   the driver calculates the voltage instruction value when the determiner determines that the phase current is not detectable in the at least two phases, the calculation of the voltage instruction value being based on the phase current calculated in a three-phase fixed coordinate system based on (i) a past current value (Iγr and Iδr) in the two-phase rotating coordinate system and (ii) a voltage detection value of the shunt resistor in a phase current detectable phase.

7. The controller of a rotating electric machine of claim 3, wherein
   the driver calculates a current instruction value in the two-phase rotating coordinate system based on the instruction value, calculates the current value in the two-phase rotating coordinate system based on the voltage detection value of the shunt resistor, and calculates the voltage instruction value as an operation amount of a feedback control for feedback controlling the calculated current value to the current instruction value, and
   the processor performs, as a responsiveness lowering process, a process that decreases a feedback gain of the feedback control when the phase current is determined as not detectable than when the phase current is determined as detectable.

8. The controller of a rotating electric machine of claim 3, further comprising:

an estimator estimating an electric angular speed of the rotating electric machine based on the current value in the two-phase rotating coordinate system calculated based on the voltage detection value of the shunt resistor, for a feedback control of zeroing an estimation error of a magnetic pole position of the rotating electric machine, wherein the processor performs, as a responsiveness lowering process, a process that decreases a feedback gain of the feedback control when the phase current is determined as not detectable than when the phase current is determined as detectable.

9. The controller of a rotating electric machine of claim 6, wherein the driver calculates the phase current in the three-phase fixed coordinate system based on (i) the current value derived by low-pass filtering of the past current value in the two-phase rotating coordinate system and (ii) the voltage detection value of the shunt resistor in the phase current detectable phase when the determiner determines that the phase current is not detectable in the at least two phases, and the processor performs, as a responsiveness lowering process, a process that increases a time constant of the low-pass filtering when the phase current is determined as not detectable, than when the phase current is determined as detectable.

10. The controller of a rotating electric machine of claim 9, wherein the processor increases the time constant when the electric angular speed of the rotating electric machine is high than when the electric angular speed thereof is low.

* * * * *